(12) United States Patent
Takeda et al.

(10) Patent No.: US 7,519,029 B2
(45) Date of Patent: *Apr. 14, 2009

(54) RADIO COMMUNICATION SYSTEM, BASE STATION, RELAY STATION, MOBILE STATION, AND PACKET TRANSMISSION CONTROL METHOD

(75) Inventors: Shinji Takeda, Yokohama (JP); Atsushi Fujiwara, Yokohama (JP); Hitoshi Yoshino, Yokosuka (JP); Toru Otsu, Yokohama (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1310 days.

This patent is subject to a terminal disclaimer.

(21) Appl. No.: 10/328,025

(22) Filed: Dec. 26, 2002

(65) Prior Publication Data

US 2003/0125067 A1    Jul. 3, 2003

(30) Foreign Application Priority Data

Dec. 28, 2001    (JP) ............................ P2001-400814

(51) Int. Cl.
*H04B 7/216* (2006.01)
*H04B 7/00* (2006.01)

(52) U.S. Cl. ..................................... 370/335; 455/522
(58) Field of Classification Search .................. None
See application file for complete search history.

(56) References Cited

U.S. PATENT DOCUMENTS

| | | | | |
|---|---|---|---|---|
| 6,097,703 | A * | 8/2000 | Larsen et al. | 370/254 |
| 6,405,052 | B1 * | 6/2002 | Faber | 455/522 |
| 6,414,955 | B1 * | 7/2002 | Clare et al. | 370/390 |
| 6,459,881 | B1 * | 10/2002 | Hoder et al. | 455/11.1 |
| 6,898,437 | B1 * | 5/2005 | Larsen et al. | 455/522 |

(Continued)

FOREIGN PATENT DOCUMENTS

EP    0 579 372 A2    1/1994

(Continued)

OTHER PUBLICATIONS

S. Xu, et al., IEEE Communications Magazine, pp. 130-137, "Does the IEEE 802.11 MAC Protocol Work Well in Multihop Wireless AD HOC Networks?", Jun. 2001.

*Primary Examiner*—Melvin Marcelo
*Assistant Examiner*—Clemence Han
(74) *Attorney, Agent, or Firm*—Oblon, Spivak, McClelland, Maier & Neustadt, P.C.

(57) ABSTRACT

The object is to control interference in a permissible range by applying the CDMA system to signal collision in the conventional CSMA and TDMA base multihop systems and to relax the hidden terminal problem and others to enhance the throughput of the entire system by grouping of channel groups in multihop transmission and by control of transmission based on an interference level from another station. A multihop relay station calculates a desired signal level, for example, from an interference level at its own station of a packet sent from a mobile station, and notifies the mobile station of the desired signal level; and the mobile station calculates a transmission power amount of a packet from the desired signal level, determines whether the packet is transmissible to the station as a source of the desired signal level, and transmits the packet to the source station determined as a packet-transmissible station.

63 Claims, 18 Drawing Sheets

U.S. PATENT DOCUMENTS

| | | | |
|---|---|---|---|
| 7,061,891 B1 * | 6/2006 | Kilfoyle et al. | 370/335 |
| 2003/0123401 A1 * | 7/2003 | Dean | 370/318 |
| 2006/0083196 A1 * | 4/2006 | Kilfoyle et al. | 370/328 |

FOREIGN PATENT DOCUMENTS

| | | |
|---|---|---|
| EP | 1 039 689 A2 | 9/2000 |
| EP | 1 117 193 | 7/2001 |
| JP | 10-215219 | 8/1998 |
| JP | 11-074835 | 3/1999 |
| JP | 2001-169336 | 6/2001 |
| JP | 2001-237764 | 8/2001 |
| JP | 2001-244864 | 9/2001 |
| WO | WO 96/03813 | 2/1996 |
| WO | WO 00/39967 | 7/2000 |
| WO | WO 00/60763 | 10/2000 |
| WO | WO 00/74263 | 12/2000 |
| WO | WO 01/08322 A1 | 2/2001 |
| WO | WO 01/11800 A1 | 2/2001 |

* cited by examiner

RADIO COMMUNICATION SYSTEM, BASE STATION, RELAY STATION, MOBILE STATION, AND PACKET TRANSMISSION CONTROL METHOD

BACKGROUND OF THE INVENTION

1. Field of the Invention

The present invention relates to a radio communication system, a base station, a relay station, a mobile station, and a packet transmission control method to which the multihop technology of establishing connection between a mobile station and a base station through multi-step relaying by relay stations, is applied.

In the radio communication system according to the present invention, stations associated with one communication operation include three stations, "base station," "relay station," and "mobile station," wherein the "base station" will refer to a station that can be linked with another base station through core network, the "mobile station" to a terminal that first requests transmission of a packet or that receives a packet last (i.e., a final destination), and the "relay station" to a terminal that functions to relay a packet from the mobile station to the base station or to relay a packet from the base station to the mobile station.

The term "transmitting direction of a packet" generally refers to an "uplink direction" from the mobile station to the base station and a "downlink direction" from the base station to the mobile station in the above radio communication system, and the "uplink direction" and "downlink direction" will also be used under the above meanings. The term "hop count" means the number of relays carried out by stations existing between a transmission-originating station and the destination station. For example, in the case of communication in the uplink direction, the hop count means the number of relays carried out by mobile stations or relay stations between the base station and the mobile station when the mobile station performs the communication; specifically, the hop count of the base station is 0, the hop count of a mobile station capable of direct communication therewith is 1, and the hop count of a mobile station or a relay station other than those is assumed to increase by one per relay. The hop count in the embodiments of the invention described hereinafter means the foregoing "number of relays carried out by mobile stations or relay stations between the base station and the mobile station when the mobile station performs the communication." In the case of communication in the downlink direction, the hop count is the number of relays carried out by base stations or relay stations between the base station and the mobile station when the base station performs the communication.

2. Related Background Art

In the conventional cellular mobile communication systems, a mobile station selects a base station yielding the highest reception level at every moment and establishes direct communication with the selected base station to participate in a network. On that occasion, if the reception level from the base station transmitting signals at the maximum power is below a required value, the mobile station will fail to establish communication with the base station.

In order to solve this problem, there are proposals for the multihop system of relaying signals via other mobile stations to establish communication with the base station on the occasion of failure in direct communication with the base station. For example, the mobile station 14 shown in FIG. 1 is able to establish direct communication with the base station 12, but the mobile station 11 is unable to establish direct communication with the base station 12, because an obstruction 15 exists between the mobile station 11 and the base station 12. The multihop technology is a technique wherein, in the case of the failure in direct communication, another mobile station 13 having a relaying function acts as a relay station to relay communication between the mobile station 11 and the base station 12, thereby implementing the communication between the mobile station 11 and the base station 12.

Since the multihop system as described enables communication of the mobile station lying in an area in which radio waves from the base station are unreachable, it facilitates installation of stations used to be hard to install because of buildings and topographic features. In the conventional methods the entire service area had to be covered by only cells of base stations, whereas adoption of the multihop system enables the mobile stations to establish communication by multihop even if there are gaps between cells. Therefore, the multihop system makes it feasible to decrease the number of base stations and to reduce cost necessary for construction of networks.

However, the CSMA base multihop system proposed heretofore suffered the so-called hidden terminal problem (the problem that, because adjacent stations transmit signals at the same frequency, a station lying in an overlapping area of cells of these adjacent stations fails to receive signals because of collision of received radio waves from the stations (e.g., reference is made to the report "Title: "Does IEEE 802.11 MAC protocol work well on multihop wireless ad-hoc networks," Author: Shugong Xu, et al." published in "IEEE communication magazine (2001)")), and problems of increase of traffic and decrease of throughput of the system due to the hidden terminal problem and others still remained unsolved.

In the conventional cellular mobile communication systems, as described above, the range of the service area was largely affected by arrangement of base stations and there arose the problem that the mobile stations failed to establish communication in areas where reception levels of radio waves from the base stations were low. The conventional CSMA and TDMA base multihop systems are promising as means for enabling the above incommunicable mobile stations to establish communication, but the hidden terminal problem and others occurred depending upon arrangement of relay stations, so as to cause increase of traffic and decrease of throughput of the system.

The present invention has been accomplished in order to solve the above problems, and an object of the invention is to provide a radio communication system, a base station, a relay station, a mobile station, and a packet transmission control method that enable a mobile station to establish communication more securely independently of arrangement of relay stations while avoiding the increase of traffic and the decrease of throughput of the system.

SUMMARY OF THE INVENTION

In order to achieve the above object, a radio communication system according to the present invention is a radio communication system comprising a base station, a mobile station, and a relay station having a relaying function in multihop packet transmission and configured to perform communication based on a wireless packet transmission system, wherein a receiver station in the packet transmission comprises: interference level measuring means for measuring an interference level at the time of receiving a packet; desired signal level calculating means for calculating a desired signal level on the basis of the interference level obtained in the measurement; and desired signal level notifying means for motifying a sender station of the desired signal level thus calculated; and wherein the sender station comprises: transmission power amount calculating means for calculating a transmission power amount of a packet on the basis of the desired signal level notified of by the receiver station; and determining means for determining whether the packet is transmissible to the receiver station, on the basis of the transmission power amount calculated by the transmission power amount calculating means. In a certain packet transmission stage, any of the base station, the mobile station, and the relay station can be the "receiver station." Likewise, any of the base station, the mobile station, and the relay station can also be the "sender station."

Namely, in the receiver station in packet transmission, the interference level measuring means measures the interference level at the time of receiving a packet, the desired signal level calculating means calculates the desired signal level based on the interference level obtained in the measurement, and the desired signal level notifying means notifies the sender station of the desired signal level thus calculated. In the sender station, the transmission power amount calculating means calculates the transmission power amount of a packet on the basis of the desired signal level thus notified of, and the determining means determines whether the packet is transmissible to the receiver station, on the basis of the transmission power amount thus calculated. The sender station performs the packet transmission control by the search for links and the determination on whether to send the packet, on the basis of the interference level at the receiver station in the manner as described. In this way the sender station is notified of the desired signal level obtained on the basis of the interference level at the receiver station, calculates the transmission power amount of the packet on the basis of the desired signal level, and determines whether the packet is transmissible to the receiver station, on the basis of the transmission power amount calculated, whereby it is feasible to implement the appropriate determination on whether to send the packet in accordance with the interference level at the receiver station and to avoid the hidden terminal problem and the inconveniences including the increase of traffic, the decrease of throughput of the system, etc., independently of the arrangement of relay stations.

The above radio communication system is characterized by the determination on whether to transmit the packet in accordance with the interference level at the receiver station, which is a feature different from the CSMA/CD system configured to determine whether to transmit the packet on the basis of an interference signal, instead of the interference level.

Another radio communication system according to the present invention is a radio communication system comprising a base station, a mobile station, and a relay station having a relaying function in multihop packet transmission and configured to perform communication based on a wireless packet transmission system, wherein a receiver station in the packet transmission comprises: interference level measuring means for measuring an interference level at the time of receiving a packet; desired signal level calculating means for calculating a desired signal level on the basis of the interference level obtained in the measurement; determining means for determining whether a packet is transmissible from the sender station, on the basis of at least one of the interference level, the desired signal level, a reception level of a control signal, and a hop count from a transmission-originating station to its own station; and notifying means for notifying the sender station of the desired signal level according to a result of the determination by the determining means.

Namely, in the receiver station in packet transmission, the interference level measuring means measures the interference level at the time of receiving a packet, and the desired signal level calculating means calculates the desired signal level on the basis of the interference level obtained in the measurement. Then the determining means determines whether a packet is transmissible from the sender station, on the basis of at least one of the interference level, the desired signal level, the reception level of the control signal, and the hop count from the transmission-originating station to its own station, and the notifying means notifies the sender station of the desired signal level according to the result of the determination by the determining means. In this way the receiver station determines whether the packet is transmissible from the sender station, on the basis of at least one of the interference level at the receiver station, the desired signal level, the reception level of the control signal, and the hop count from the transmission-originating station to its own station, and notifies the sender station of the desired signal level according to the result of the determination. This makes it feasible to implement in the receiver station, the appropriate determination on whether to transmit the packet from the sender station, on the basis of at least one of the interference level at the receiver station, the desired signal level, the reception level of the control signal, and the hop count from the transmission-originating station to its own station.

In the radio communication systems as described above, preferably, the receiver station is configured to further comprise: destination deciding means for deciding a next receiver station as a destination of a packet on the basis of at least one of a reception level of a control signal, an interference level at its own station, and a hop count from a transmission-originating station to its own station.

The interference level measured by the interference level measuring means can be an interference level at the receiver station of a channel group used in reception of the packet.

There are no specific restrictions on the above-stated wireless packet transmission system to which the present invention is applied, but the present invention is especially suitably applicable to systems of identifying users by codes, using the same frequency and the same time (e.g., CDMA and OFCDM). Particularly, it is preferable in the present invention that the CDMA system be used as the wireless packet transmission system, and application examples thereof will be described later.

In order to achieve the above object, another radio communication system according to the present invention is a radio communication system comprising a base station, a mobile station, and a relay station having a relaying function in packet transmission and applying CDMA to a radio multiplexing scheme of packet transmission, wherein the base station or the relay station comprises: interference level measuring means for measuring an interference level at its own station of a channel group used in reception, at the time of receiving a packet; desired signal level calculating means for calculating a desired signal level on the basis of the interference level obtained in the measurement; and desired signal level notifying means for motifying the mobile station of the desired signal level thus calculated; and wherein the mobile station comprises: transmission power amount calculating means for calculating a transmission power amount of a packet on the basis of the desired signal level notified of by the base station or the relay station; and determining means for determining whether the packet is transmissible to the station as a source of the desired signal level, on the basis of the transmission power amount calculated by the transmission power amount calculating means.

Namely, in the base station or the relay station, the desired signal level calculating means calculates the desired signal level on the basis of the reception level of the packet sent from the mobile station and the interference level at its own station, and the desired signal level notifying means notifies the mobile station of the desired signal level thus calculated. In the mobile station, the transmission power amount calculating means then calculates the transmission power amount of the packet on the basis of the desired signal level notified of, and the determining means determines whether the packet is transmissible to the station as a source of the desired signal level, on the basis of the transmission power amount calculated. In this manner the mobile station performs the packet transmission control by the search for links and the determination on whether to transmit the packet, based on the interference level at the base station or the relay station. In this way the mobile station is notified of the desired signal level obtained based on the interference level at the correspondent station, calculates the transmission power amount of the packet on the basis of the desired signal level, and determines whether the packet is transmissible to the correspondent station, on the basis of the transmission power amount thus calculated, whereby it is feasible to implement the appropriate determination on whether to transmit the packet in accordance with the interference level at the correspondent station and to avoid the hidden terminal problem and the inconveniences including the increase of traffic, the decrease of throughput of the system, etc., independently of the arrangement of relay stations.

The present invention is also applicable to downlink packet transmission from the base station via the relay station to the mobile station, as well as the uplink packet transmission from the mobile station via the relay station to the base station, and a radio communication system according to the present invention is a radio communication system comprising a base station, a mobile station, and a relay station having a relaying function in packet transmission and applying CDMA to a radio multiplexing scheme of packet transmission, wherein each of the base station, the relay station, and the mobile station comprises: interference level measuring means for measuring an interference level at its own station of a channel group used in reception, at the time of receiving a packet; desired signal level calculating means for calculating a desired signal level on the basis of the interference level obtained in the measurement; desired signal level notifying means for notifying a sender station of the packet, of the desired signal level thus calculated; transmission power amount calculating means for calculating a transmission power amount of a packet on the basis of a desired signal level notified of by another station, at the time of transmitting or relaying a packet; and determining means for determining whether the packet is transmissible to the station as a source of the desired signal level, on the basis of the transmission power amount calculated by the transmission power amount calculating means.

As described above, the base station, the relay station, and the mobile station each have ① the interference level measuring means, ② the desired signal level calculating means, ③ the desired signal level notifying means, ④ the transmission power amount calculating means, and ⑤ the determining means, and in the uplink and downlink packet transmissions, the base station, the relay station, and the mobile station perform the packet transmission control by the search for links and the determination on whether to transmit the packet on the basis of the interference level at the transmission partner.

For example, in the case of packet transmission in the downlink direction from the base station to one relay station, in the one relay station, the desired signal level calculating means calculates the desired signal level on the basis of a reception level of a packet sent from the base station and an interference level at its own station, and the desired signal level notifying means notifies the base station of the desired signal level thus calculated. In the base station, the transmission power amount calculating means then calculates a transmission power amount of a packet on the basis of the desired signal level thus notified of, and the determining means determines whether the packet is transmissible to the station as a source of the desired signal level, on the basis of the transmission power amount thus calculated. This makes it feasible to implement the appropriate determination on whether to transmit the packet in accordance with the interference level at the correspondent station even in the downlink communication and to avoid the hidden terminal problem and the inconveniences including the increase of traffic, the decrease of throughput of the system, etc., independently of the arrangement of relay stations.

In the various radio communication systems described above, each of the base station, the mobile station, and the relay station constituting them is preferably configured to have the means (functions) described below.

Namely, the base station is preferably configured to further comprise: attribution information holding means which holds attribution information of each mobile station and each relay station capable of direct communication with its own station, and attribution information of each mobile station and each relay station incapable of direct communication with its own station but capable of direct communication with a relay station.

The base station is also preferably configured to further comprise: destination deciding means for deciding a mobile station or a relay station as a destination to which the base station should transmit a packet, on the basis of at least one of a reception level of a control signal, an interference level at its own station, and a hop count from a transmission-originating station to its own station.

Methods of determining the destination by the above destination deciding means and by destination deciding means described hereinafter include, for example, a method of minimizing the hop count (FIG. 7), a method of selecting a station yielding a minimum of relative transmission powers calculated from received SIR of control signals and interference levels at senders of the control signals (FIG. 8), and so on. These will be described later.

The base station is preferably configured to further comprise: channel group selecting means for selecting a channel group for transmission/reception on the basis of a transmitting direction of a packet; and signal transmitting means for transmitting a signal to be transmitted, on a channel according to the selected channel group.

The mobile station is preferably configured to further comprise: destination deciding means for deciding a base station or a relay station as a destination to which the mobile station should transmit a packet, on the basis of a reception level of a control signal or a hop count from the base station to its own station.

The mobile station is preferably configured to further comprise: channel group selecting means for selecting a channel group for transmission/reception on the basis of both or one of a hop count from the base station to its own station and a transmitting direction of a packet; and signal transmitting means for transmitting a signal to be transmitted, on a channel according to the selected channel group.

The relay station is preferably configured to further comprise: destination deciding means for deciding a station as a destination to which the relay station should transmit a packet, on the basis of a reception level of a control signal or a hop count from the transmission-originating station to its own station.

The relay station is preferably configured to further comprise: decoding means for despreading a signal received from the mobile station, the base station, and another relay station to decode the signal into an information sequence signal; and spread signal generating means for spreading the decoded information sequence signal to generate a spread signal.

The radio communication system is preferably configured so that, when the relay station comprises at least the transmission power amount calculating means, the transmission power calculated by the transmission power amount calculating means is assigned to the spread signal generated by the spread signal generating means and the spread signal is transmitted.

The relay station is preferably configured to further comprise: channel group selecting means for selecting a channel group for transmission/reception on the basis of both or one of a hop count from the transmission-originating station to its own station and a transmitting direction of a packet; and signal transmitting means for transmitting a signal to be transmitted, on a channel according to the selected channel group.

The relay station in the present invention may be comprised of a station having a function of the mobile station, or a device installed in a vehicle or in stationary facilities.

Incidentally, the present invention can also be grasped from aspects of the invention of the base station, the mobile station, and the relay station constituting the system, as well as the aspect of the invention of the radio communication system, while achieving like operations and effects. Namely, the invention can be described as follows.

A base station according to the present invention is a base station constituting a radio communication system for communication based on a wireless packet transmission system, with a mobile station and a relay station having a relaying function in packet transmission, the base station comprising: interference level measuring means for measuring an interference level at the time of receiving a packet; desired signal level calculating means for calculating a desired signal level on the basis of the interference level obtained in the measurement; and desired signal level notifying means for notifying a sender station of the packet, of the desired signal level thus calculated.

The interference level measured by the interference level measuring means can be an interference level at the base station of a channel group used in reception of the packet.

Another base station according to the present invention is a base station constituting a radio communication system applying CDMA to a radio multiplexing scheme of packet transmission, with a mobile station and a relay station having a relaying function in packet transmission, the base station comprising: interference level measuring means for measuring an interference level at its own station of a channel group used in reception, at the time of receiving a packet; desired signal level calculating means for calculating a desired signal level on the basis of the interference level obtained in the measurement; and desired signal level notifying means for notifying a sender station of the packet, of the desired signal level thus calculated.

Another base station according to the present invention is a base station constituting a radio communication system applying CDMA to a radio multiplexing system of packet transmission, with a mobile station and a relay station having a relaying function in packet transmission, the base station comprising: interference level measuring means for measuring an interference level at its own station of a channel group used in reception, at the time of receiving a packet; desired signal level calculating means for calculating a desired signal level on the basis of the interference level obtained in the measurement; desired signal level notifying means for notifying a sender station of the packet, of the desired signal level thus calculated; transmission power amount calculating means for calculating a transmission power amount of a packet on the basis of a desired signal level notified of by another station, at the time of transmitting a packet; and determining means for determining whether the packet is transmissible to the station as a source of the desired signal level, on the basis of the transmission power amount calculated by the transmission power amount calculating means.

This base station is preferably configured to further comprise attribution information holding means which holds attribution information of each mobile station and each relay station capable of direct communication with its own station, and attribution information of each mobile station and each relay station incapable of direct communication with its own station but capable of direct communication with a relay station.

This base station is preferably configured to further comprise destination deciding means for deciding a mobile station or a relay station as a destination to which the base station should transmit a packet, on the basis of at least one of a reception level of a control signal, an interference level at its own station, and a hop count from a transmission-originating station to its own station.

This base station is preferably configured to further comprise channel group selecting means for selecting a channel group for transmission/reception on the basis of a transmitting direction of a packet; and signal transmitting means for transmitting a signal to be transmitted, on a channel according to the selected channel group.

A mobile station according to the present invention is a mobile station constituting a radio communication system for communication based on a wireless packet transmission system, with a base station and a relay station having a relaying function in packet transmission, the mobile station comprising: transmission power amount calculating means for calculating a transmission power amount of a packet on the basis of a desired signal level notified of by a sender station of the packet; and determining means for determining whether the packet is transmissible from the sender station, on the basis of the transmission power amount calculated by the transmission power amount calculating means.

The above mobile station is preferably configured to further comprise interference level measuring means for measuring an interference level at the time of receiving a packet; desired signal level calculating means for calculating a desired signal level on the basis of the interference level obtained in the measurement; and desired signal level notifying means for notifying a sender station of the packet, of the desired signal level thus calculated.

In this case, the interference level measured by the interference level measuring means can be an interference level at the mobile station of a channel group used in reception of the packet.

Another mobile station according to the present invention is a mobile station constituting a radio communication system applying CDMA to a radio multiplexing scheme of packet transmission, with a base station and a relay station having a relaying function in packet transmission, the mobile station comprising: transmission power amount calculating means for calculating a transmission power amount of a packet on the basis of a desired signal level notified of by the base station or the relay station; and determining means for determining whether the packet is transmissible to the station as a source of the desired signal level, on the basis of the transmission power amount calculated by the transmission power amount calculating means.

The above mobile station is preferably configured to further comprise destination deciding means for deciding a base station or a relay station as a destination to which the mobile station should transmit a packet, on the basis of at least one of a reception level of a control signal, an interference level at its own station, and a hop count from a transmission-originating station to its own station.

The mobile station is preferably configured to further comprise channel group selecting means for selecting a channel group for transmission/reception on the basis of both or one of a hop count from the base station to its own station and a transmitting direction of a packet; and signal transmitting means for transmitting a signal to be transmitted, on a channel according to the selected channel group.

A relay station according to the present invention is a relay station constituting a radio communication system for communication based on a wireless packet transmission system, with a base station and a mobile station and having a relaying function in packet transmission, the relay station comprising: interference level measuring means for measuring an interference level at the time of receiving a packet; desired signal level calculating means for calculating a desired signal level on the basis of the interference level obtained in the measurement; and desired signal level notifying means for motifying a sender station of the packet, of the desired signal level thus calculated.

The above relay station is preferably configured to further comprise determining means for determining whether a packet is transmissible from the sender station, on the basis of at least one of the interference level, the desired signal level, a reception level of a control signal, and a hop count from a transmission-originating station to its own station, and in a configuration wherein the desired signal level notifying means notifies the sender station of the desired signal level according to a result of the determination by the determining means.

The interference level measured by the interference level measuring means can be an interference level at the relay station of a channel group used in reception of the packet.

Another relay station according to the present invention is a relay station constituting a radio communication system applying CDMA to a radio multiplexing scheme of packet transmission, with a base station and a mobile station and having a relaying function in packet transmission, the relay station comprising: interference level measuring means for measuring an interference level at its own station of a channel group used in reception, at the time of receiving a packet; desired signal level calculating means for calculating a desired signal level on the basis of the interference level obtained in the measurement; and desired signal level notifying means for notifying a sender station of the packet, of the desired signal level thus calculated.

The relay station according to the present invention is preferably configured to comprise transmission power amount calculating means for calculating a transmission power amount of a packet on the basis of a desired signal level notified of by another station, at the time of relaying a packet; and determining means for determining whether the packet is transmissible to the station as a source of the desired signal level, on the basis of the transmission power amount calculated by the transmission power amount calculating means.

The relay station is preferably configured to further comprise destination deciding means for deciding a station as a destination to which the relay station should transmit a packet, on the basis of at least one of a reception level of a control signal, an interference level at its own station, and a hop count from a transmission-originating station to its own station.

The relay station is preferably configured to further comprise decoding means for despreading a signal received from the mobile station, the base station, and another relay station to decode the signal into an information sequence signal; and spread signal generating means for spreading the decoded information sequence signal to generate a spread signal.

The relay station is preferably configured so that, when the relay station comprises at least the transmission power amount calculating means, the transmission power calculated by the transmission power amount calculating means is assigned to the spread signal generated by the spread signal generating means and the spread signal is transmitted.

The relay station is preferably configured to further comprise channel group selecting means for selecting a channel group for transmission/reception on the basis of a hop count from a transmission-originating station to its own station; and signal transmitting means for transmitting a signal to be transmitted, on a channel according to the selected channel group.

The relay station may be configured so that the relay station is comprised of a station having a function of the mobile station, or a relaying device installed in a vehicle or in stationary facilities.

Incidentally, the present invention can also be grasped from an aspect of the invention of a packet transmission control method executed in the radio communication system, as well as the aspect of the invention as the radio communication system and the aspects of the invention of the base station, the mobile station, and the relay station constituting the system, while achieving like operations and effects. Namely, the invention can be described as follows.

A packet transmission control method according to the present invention is a packet transmission control method in a radio communication system comprising a base station, a mobile station, and a relay station having a relaying function in multihop packet transmission and configured to perform communication based on a wireless packet transmission system, the packet transmission control method comprising: an interference level measuring step wherein a receiver station in the packet transmission measures an interference level; a desired signal level calculating step wherein the receiver station calculates a desired signal level on the basis of the interference level obtained in the measurement; a desired signal level notifying step wherein the receiver station notifies a sender station of the desired signal level thus calculated; a transmission power amount calculating step wherein the sender station calculates a transmission power amount of a packet on the basis of the desired signal level thus notified of; a determining step wherein the sender station determines whether the packet is transmissible to the receiver station, on the basis of the transmission power amount thus calculated; and a packet transmitting step wherein the sender station transmits the packet by a power according to the transmission power amount for the receiver station, to the receiver station determined as a packet-transmissible station. In a certain packet transmission stage, any of the base station, the mobile station, and the relay station can be the "receiver station." Likewise, any of the base station, the mobile station, and the relay station can be the "sender station."

Another packet transmission control method according to the present invention is a packet transmission control method executed at the time of transmitting a packet from a mobile station via a relay station to a base station in a radio communication system comprising a base station, a mobile station, and a relay station having a relaying function in packet transmission and applying CDMA to a radio multiplexing scheme of packet transmission, the packet transmission control method comprising: an interference level measuring step wherein a receiver station of a packet measures an interference level at its own station of the received packet; a desired signal level calculating step wherein the receiver station calculates a desired signal level on the basis of the interference level obtained in the measurement; a desired signal level notifying step wherein the receiver station notifies a sender station of the packet, of the desired signal level thus calculated; a transmission power amount calculating step wherein the sender station calculates a transmission power amount of a packet on the basis of the desired signal level thus notified of; a determining step wherein the sender station determines whether the packet is transmissible to the receiver station, on the basis of the transmission power amount thus calculated; and a packet transmitting step wherein the sender station transmits the packet by a power according to the transmission power amount for the receiver station, to the receiver station determined as a packet-transmissible station.

The method herein preferably further comprises a mobile station destination deciding step wherein the mobile station defined as the receiver station decides a base station or a relay station as a destination to which the mobile station should transmit a packet, on the basis of at least one of a reception level of a control signal, an interference level at its own station, and a hop count from a transmission-originating station to its own station.

The above packet transmission control method preferably further comprises a base station destination deciding step wherein the base station defined as the receiver station decides a mobile station or a relay station as a destination to which the base station should transmit a packet, on the basis of at least one of a reception level of a control signal, an interference level at its own station, and a hop count from a transmission-originating station to its own station.

The above packet transmission control method preferably further comprises a relay station destination deciding step wherein the relay station defined as the receiver station decides a station as a destination to which the relay station should transmit a packet, on the basis of at least one of a reception level of a control signal, an interference level at its own station, and a hop count from a transmission-originating station to its own station.

The above packet transmission control method preferably further comprises a decoding step wherein the relay station despreads a signal received from the mobile station, the base station, and another relay station to decode the signal into an information sequence signal; and a spread signal generating step wherein the relay station spreads the decoded information sequence signal to generate a spread signal.

The above packet transmission control method preferably further comprises a channel group selecting step wherein the mobile station and the relay station select a channel group for transmission/reception on the basis of both or one of a hop count from a transmission-originating station to its own station and a transmitting direction of a packet and wherein the base station selects a channel group for transmission/reception on the basis of a transmitting direction of a packet; and a signal transmitting step wherein the mobile station, the relay station, and the base station transmit a signal to be transmitted, on a channel according to the selected channel group.

In the above packet transmission control method, it is preferable to divide the transmission channels into channel groups and assign the channel groups to uplink signals and downlink signals, as described below.

For example, preferably, the channel group selecting step is to divide transmission channels for transmission of signals into two channel groups; and in a common manner in the base station, the relay station, and the mobile station, one channel group is assigned to an uplink signal a source of which is the mobile station, and the other channel group is assigned to a downlink signal a source of which is the base station.

Preferably, the channel group selecting step is to divide transmission channels for transmission of signals into four channel groups; and in a common manner in the base station, the relay station even-numbered from the base station, and the mobile station a hop count of which from the base station is an even number, a first channel group is assigned to a downlink signal a source of which is the base station, and a second channel group is assigned to an uplink signal a source of which is the mobile station, and in a common manner in the relay station odd-numbered from the base station, and the mobile station a hop count of which from the base station is an odd number, a third channel group is assigned to the downlink signal and a fourth channel group is assigned to the uplink signal.

Preferably, the channel group selecting step is to divide transmission channels for transmission of signals into N channel groups (N is an integer not less than 3); and in each of the base station, the relay station, and the mobile station, the N channel groups are assigned so that an identical channel group is assigned to an uplink signal and a downlink signal transmitted from one station and so that different channel groups are assigned to an uplink signal and a downlink signal received thereby, respectively.

Preferably, the channel group selecting step is to divide transmission channels for transmission of signals into two channel groups; transmission from the base station and from the relay station and the mobile station even-numbered from the base station is carried out by a first channel group and reception therein by a second channel group, and transmission from the relay station and the mobile station odd-numbered from the base station is carried out by the second channel group and reception therein by the first channel group.

The channel groups may be comprised of channel groups divided by frequency, may be comprised of channel groups divided by time, or maybe comprised of channel groups divided by both frequency and time. Specific embodiments of these will be described later.

As described above, the present invention has successfully overcome the problem that the mobile station failed to establish communication, depending upon the arrangement of base stations, and also has succeeded in overcoming the occurrence of the hidden terminal problem and others in the conventional CSMA and TDMA base multihop systems, and the problems of the increase of traffic and the decrease of throughput of the system. The peculiar channel group assigning methods successfully achieved reduction of interference and improvement in frequency utilization efficiency.

DESCRIPTION OF THE PREFERRED EMBODIMENTS

Figure 1:
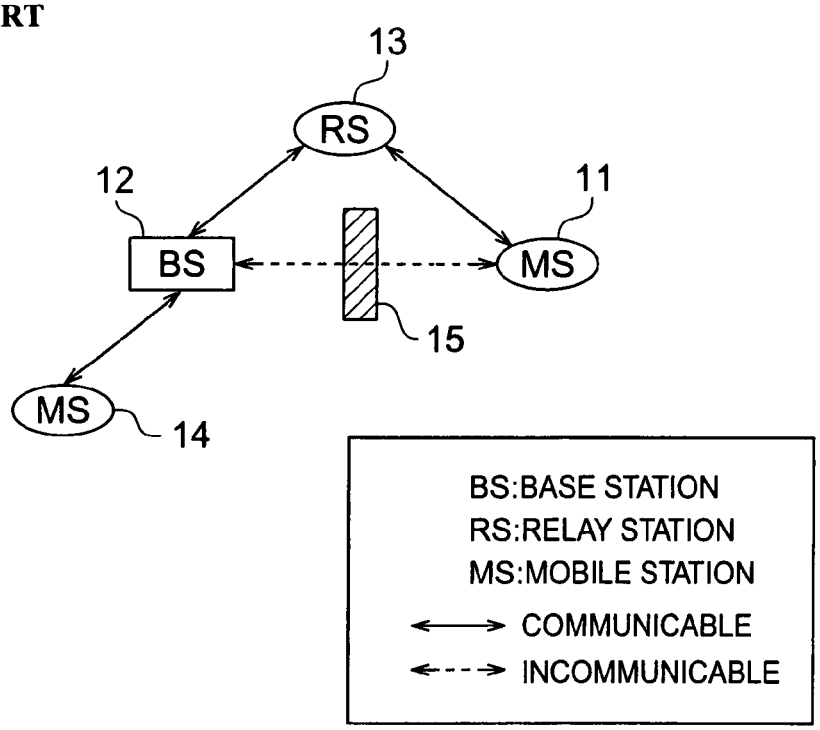
FIG. 1 is a conceptual diagram of a multihop cellular mobile communication system.

An embodiment of the present invention will be described below with reference to the drawings.

[Outline of Entire Mobile Communication System]

In the mobile communication system of the present embodiment, stations associated with one communication operation include three stations, "base station," "relay station," and "mobile station." The base station among these is a station capable of being linked with another base station through the core network, and the mobile station is a terminal that first requests transmission of a packet or that receives a packet last. The relay station is a terminal (a relay terminal) that functions to relay a packet from the mobile station to the base station or to relay a packet from the base station to the mobile station. The relay station consumes power for relaying of packets and is thus considered to be any terminal configured to accept supply of power from a solar cell or a power generator, or through a wire, in addition to terminals powered by conventional batteries; such potential terminals include those installed for the purpose of reduction of cost in place of base stations to cover the areas by telecommunications carriers, those receiving supply of electricity while moving like automobiles and trains, those fixed and receiving supply of power like automatic vending machines, and so on. Namely, the relay station can be any device having the function of the mobile station and having the relaying function, or any relaying device installed in vehicles such as automobiles, trains, or the like, and in automatic vending machines.

In the description hereinafter, let us note one communication stage in the mobile communication system and describe the invention under such definition that a mobile station as a packet source or as a packet final destination in the communication is defined as "mobile station" and a terminal or relaying device capable of functioning as a relay station, as "relay station."

Incidentally, the base station in the present system needs to secure a link with the mobile station directly or via at least one relay station. For this reason, each base station updates at every predetermined time and retains attribution information of mobile stations capable of direct communication, attribution information of relay stations capable of direct communication, and attribution information of mobile stations incapable of direct communication but capable of being linked via a relay station or relay stations, so as to be able to retain attribution information of all mobile stations capable of direct and indirect communications, whereby links are ensured between the base station and all the mobile stations capable of direct and indirect communications.

Each of mobile stations and relay stations sends a request signal with ID of its own station as information for securing paths to the base station at predetermined time intervals (or at times of origination of transmission packets). All stations receiving the request signal send relay information (e.g., including information such as ID of its own station, ID of the mobile station having sent the request signal, an interference level at its own station, the hop count to the base station, and so on) on their respective control signals indicating capability of linkage with the mobile station. The mobile station receiving the control signals decides a path from the information of the signals, sends an ACK signal to a linking station, and establishes the path.

Figure 2:
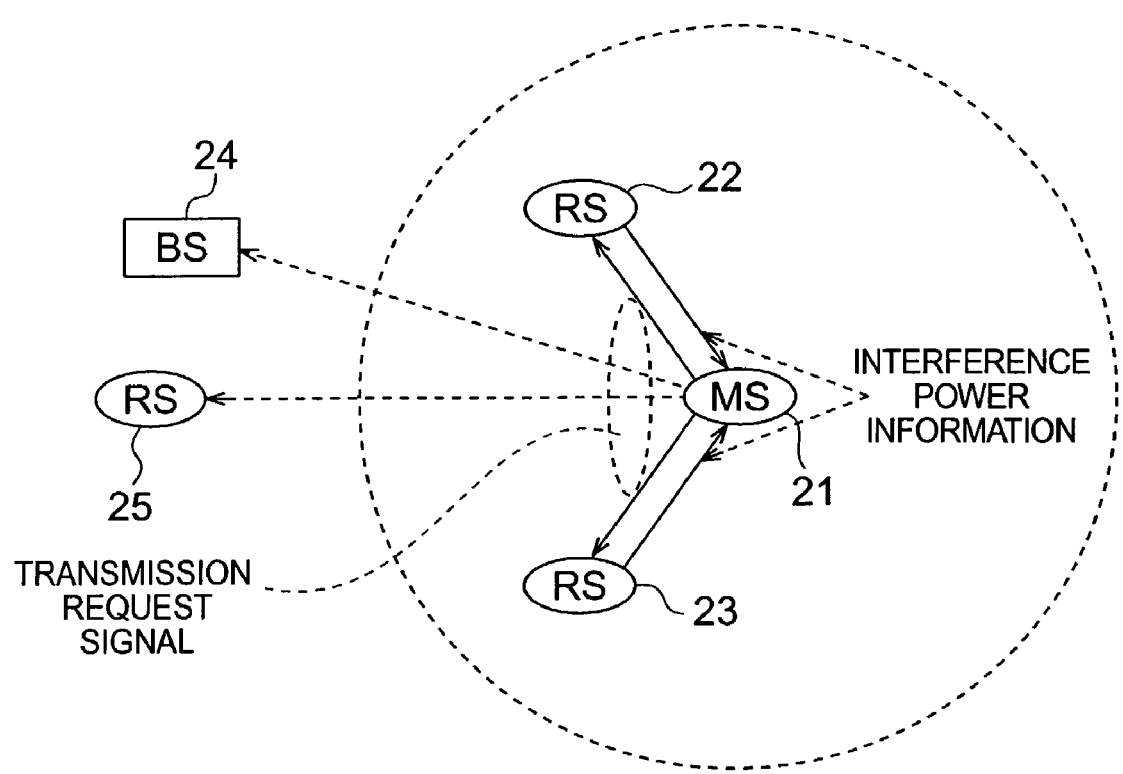
FIG. 2 is a conceptual diagram of a search for a relay station by a mobile station.

For example, the mobile station 21 shown in FIG. 2 sends a request signal for securing a path to the base station 24. A circle of a dotted line represents a reachable range of the request signal from the mobile station 21, and the relay stations 22, 23 existing in the reachable range receive the request signal and then send their respective control signals with the relay information. Then the mobile station 21 receives the control signals, decides a path from the relay information of the control signals, sends an ACK signal to a linking station (e.g., the relay station 22), and establishes the path (mobile station 21-relay station 22-base station 24).

Configurations of the relay station, mobile station, and base station constituting the present system will be described below with focus on portions associated with the present invention.

[On Relay Station]

In the present embodiment, the relay station does not function as a repeater that relays a received signal as it is, but is a terminal that has a function of demodulating a signal received from another mobile station or base station and decoding the demodulated signal into an information sequence and that functions to calculate a transmission power according to a desired signal level notified of by a station expected to receive a packet (a packet destination), again encode and modulate the information sequence, and send it on a desired channel. When CDMA is used as an access system, the relay station further has a function of despreading the received signal and a function of again spreading the information sequence obtained.

Since the relay station has the function of calculating the transmission power according to the desired signal level at the packet destination, it is feasible to implement stable transmission with high reliability by the transmission power. Since the relay station once decodes the received signal into the information sequence, it is feasible to make correction for the gain of the signal.

Figure 17A:
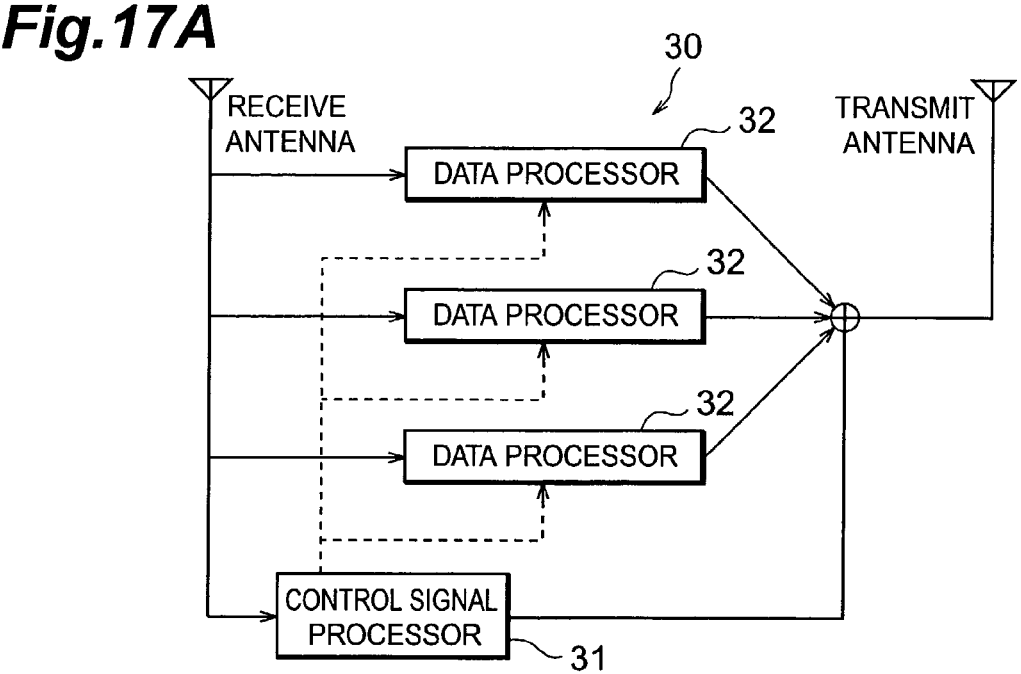
FIG. 17A is a diagram showing an overall configuration of a relay station where the selection of channel group is not carried out.

A configuration of the relay station will be described below with reference to FIGS. 17A and 17B, using an example wherein CDMA is used as an access method. As shown in FIG. 17A, the relay station 30 is comprised of a control signal processor 31 which processes signals for securing a route to the base station; and data processors 32 which process packet data; the number of data processors 32 is equal to the number of packets that can be relayed in parallel (which corresponds to the number of simultaneously relayable packets and which is "3" in the example of FIG. 17A).

Each data processor 32 extracts a desired signal from a received signal to recover an information sequence. The recovered information sequence is again subjected to coding and D/A conversion and the resultant signal is sent on a carrier wave amplified according to a transmission power amount calculated from information (e.g., information of an interference level at a packet destination and propagation loss) obtained from a transmission power controller (not shown). The transmission power controller may be installed in the control signal processor 31 or may be installed independently of the control signal processor 31 in the relay station 30.

Figure 17B:
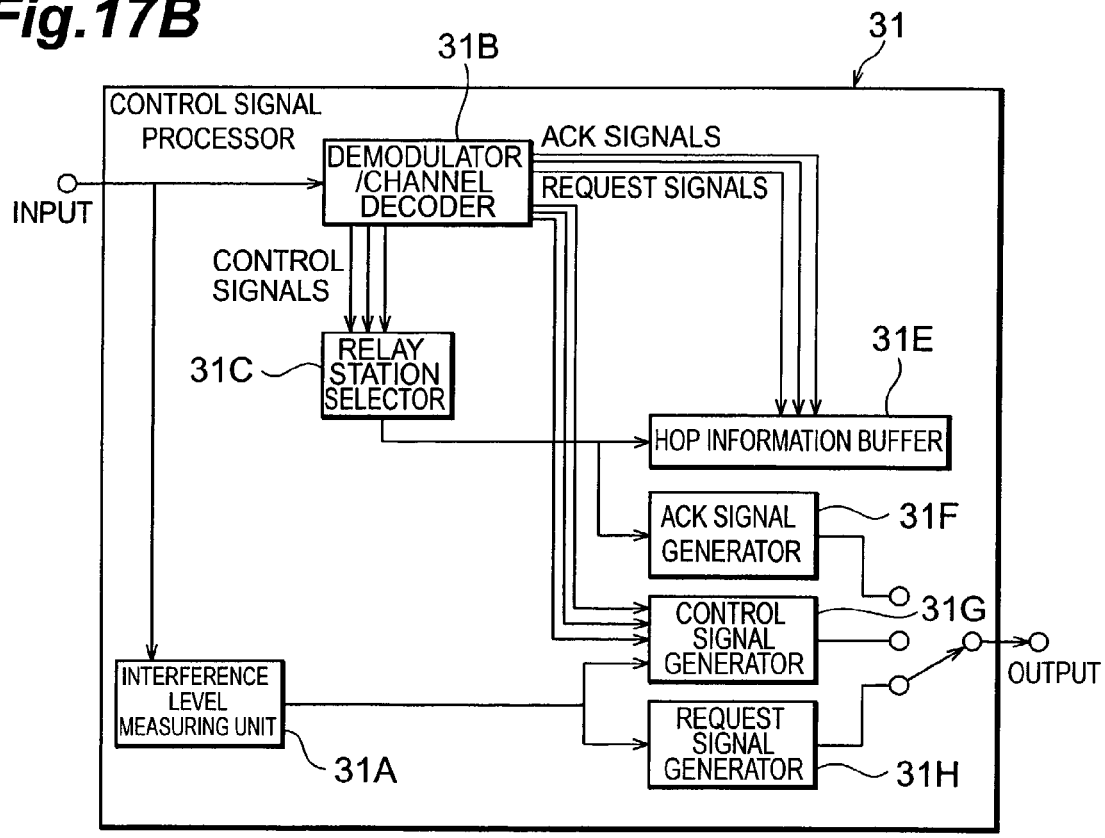
FIG. 17B is a diagram showing a configuration of a control signal processor in a relay station where the selection of channel group is not carried out.

The control signal processor 31 is comprised, as shown in FIG. 17B, of an interference level measuring unit 31A for measuring an interference level at its own station; a demodulator/channel decoder 31B for demodulating and decoding an input signal; a relay station selector 31 for selecting a relay station; a hop information buffer 31E for storing hop information and other information; an ACK signal generator 31F for generating an ACK signal; a control signal generator 31G for generating a control signal; and a request signal generator 31H for generating a request signal.

The control signal processor 31 decides which route should be used for linkage between the base station and the mobile station (or which relay station should be used). As shown in FIG. 17B, request signals, control signals, and ACK signals entering the control signal processor 31 are separated according to types and source stations of the signals in the demodulator/channel decoder 31B, the request signals are fed as triggers of the control signal generator 31G, the control signals are fed to the relay station selector 31C, the ACK signals are fed to the hop information buffer 31E, and the information is transferred to a superordinate station (a station closer to the base station).

The relay station selector 31C receives the control signals transmitted from neighboring stations, and decides a relay station or a base station to be next connected (hereinafter referred to as a "connection station"), on the basis of such information as received power to interference signal power ratios (Signal to Interference Ratios: hereinafter called "SIR") of the control signals, interference levels at originators of the control signals, hop counts to the base station, and so on.

Figure 3A:
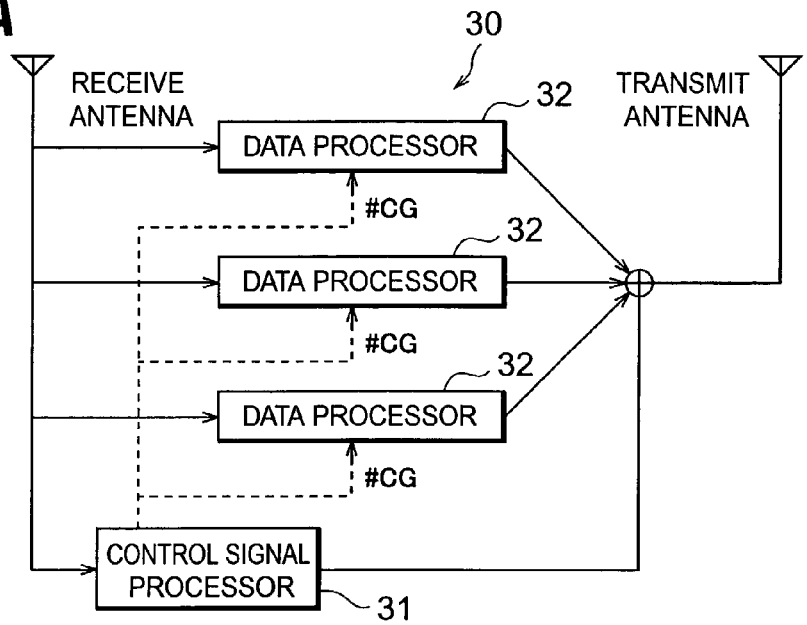
FIG. 3A is a diagram showing an overall configuration of a relay station where channel groups are selected for respective relays by a channel group assigning method.

The following will describe another configuration of the relay station in the case where a channel group used in relaying is selected for every relaying by a channel group assigning method described later, on the basis of FIGS. 3A and 3B.

Each data processor 32 shown in FIG. 3A extracts a desired signal from a received signal on the basis of information obtained from the channel group selector 31D of FIG. 3B described later and despreads it to recover information. The recovered information sequence is again encoded, spread, and subjected to D/A conversion, and the resultant signal is sent on a carrier wave (a carrier wave decided by the channel group selector 31D) amplified according to a transmission power amount calculated from the information (e.g., information of the interference level at the packet destination, propagation loss, etc.) obtained from the transmission power controller (not shown). The transmission power controller may be installed in the control signal processor 31 or may be installed independently of the control signal processor 31 in the relay station 30.

Figure 3B:
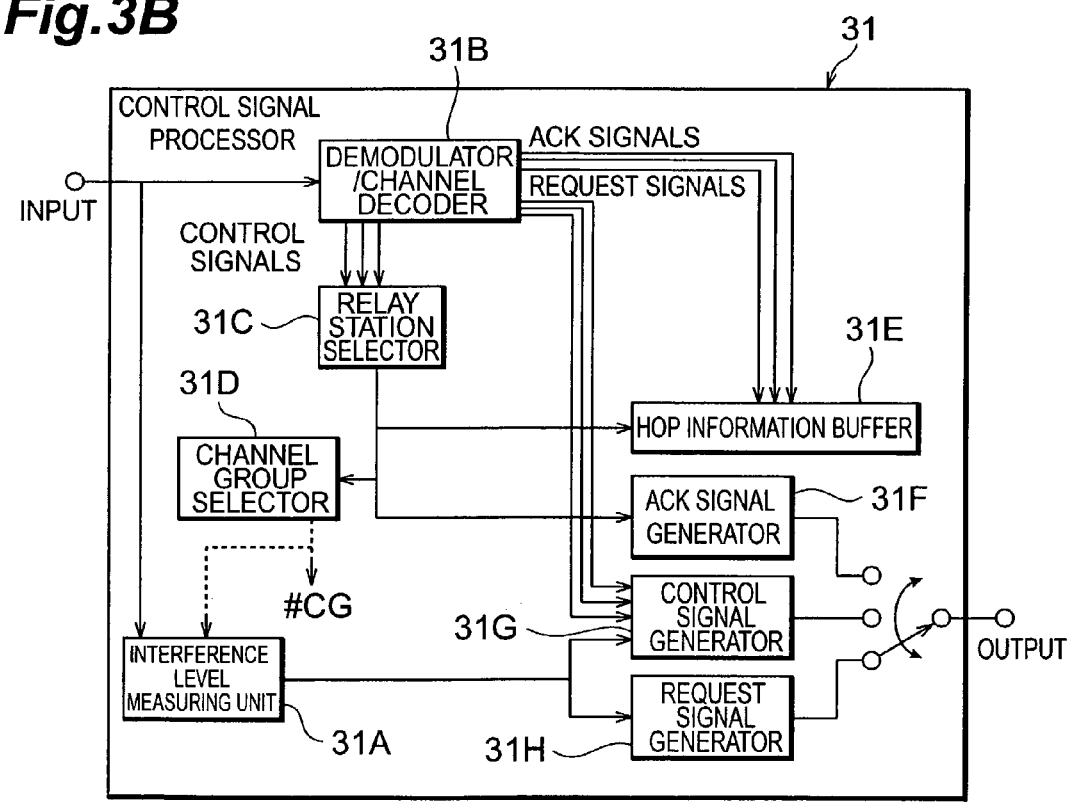
FIG. 3B is a diagram showing a configuration of a control signal processor in a relay station where channel groups are selected for respective relays by a channel group assigning method.

The control signal processor 31 is comprised, as shown in FIG. 3B, of an interference level measuring unit 31A for measuring an interference level at its own station of a channel group used in reception at the time of receiving a packet; a demodulator/channel decoder 31B for demodulating/decoding an input signal; a relay station selector 31C for selecting a relay station; a channel group selector 31D for selecting a channel group; a hop information buffer 31E for storing information of the hop count and other information; an ACK signal generator 31F for generating an ACK signal; a control signal generator 31G for generating a control signal; and a request signal generator 31H for generating a request signal.

The control signal processor 31 decides which route should be used for linkage between the base station and the mobile station (or which relay station should be used). As shown in FIG. 3B, request signals, control signals, and ACK signals entering the control signal processor 31 are separated according to types and source stations of the signals in the demodulator/channel decoder 31B, the request signals are fed as triggers of the control signal generator 31G, the control signals are fed to the relay station selector 31C, the ACK signals are fed to the hop information buffer 31E, and the information is transferred to a superordinate station (a station closer to the base station).

The relay station selector 31C receives the control signals sent from neighboring stations and decides a connection station to be next connected (a relay station or a base station) on the basis of the information such as the received power to interference signal power ratios (SIR) of the control signals, the interference levels at the originators of the control signals, the hop counts to the base station, etc., and the channel group selector 31D determines a channel group for transmission/reception according to a hop count thereof to the base station.

[On Mobile Station]

Figure 4A:
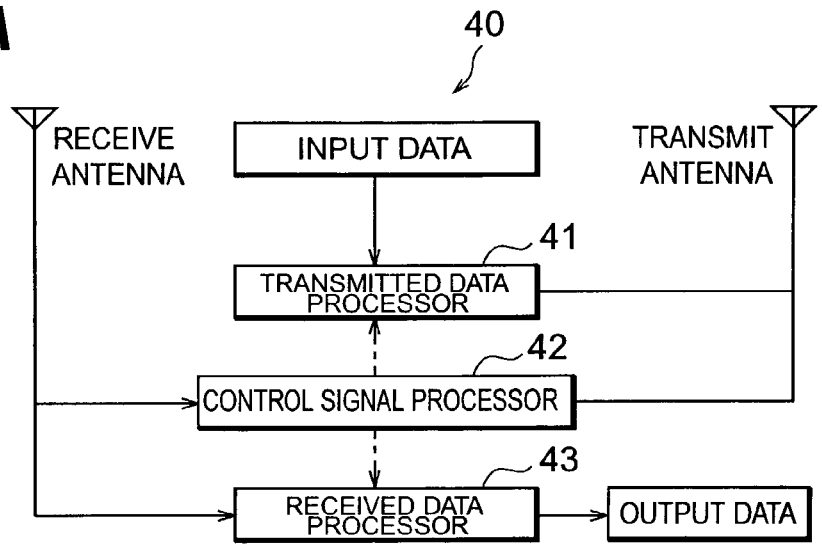
FIG. 4A is a diagram showing an overall configuration of a mobile station.

A configuration of the mobile station will be described below referring to FIGS. 4A and 18. As shown in FIG. 4A, the mobile station 40 is comprised of a transmitted data processor 41 for processing input data and transmitting resultant data after the processing; a received data processor 43 for processing a received signal and converting resultant data after the processing into output data; and a control signal processor 42 for processing a control signal, a request signal, and an ACK signal.

Figure 18:
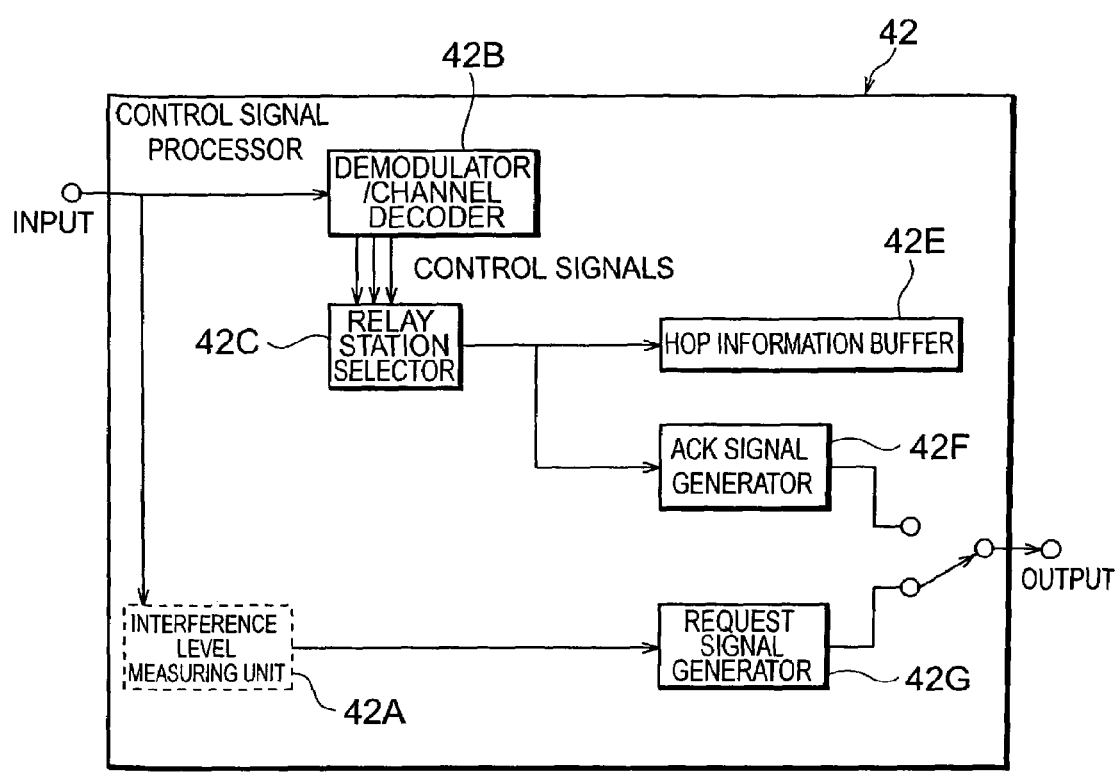
FIG. 18 is a diagram showing a configuration of a control signal processor in a mobile station where the selection of channel group is not carried out.

The control signal processor 42 among these elements is comprised, as shown in FIG. 18, of a demodulator/channel decoder 42B for demodulating/decoding an input signal; a relay station selector 42C for selecting a relay station; a hop information buffer 42E for storing hop information and other information; an ACK signal generator 42F for generating an ACK signal; and a request signal generator 42G for generating a request signal.

In addition to the above configuration, the control signal processor 42 is preferably configured to further include an interference level measuring unit 42A for measuring an interference level at its own station, which is indicated by a dashed line in FIG. 18. This enables the relay station to determine whether a packet is transmissible, on the basis of the interference level at the mobile station in downlink packet transmission from the base station via the relay station to the mobile station, in much the same manner as in the uplink packet transmission. It is assumed in the present embodiment that there also exists the interference level measuring unit 42A indicated by the dashed line in FIG. 18 and that the packet transmission control according to the present invention is executed in both the uplink and downlink packet transmissions. A path deciding method and others about this control will be described later.

In the control signal processor 42 in the mobile station 40 as described above, control signals discriminated for respective senders by the demodulator/channel decoder 42B are fed to the relay station selector 42C. Then the relay station selector 42C selects one relay station or one base station meeting connection conditions, the ACK signal generator 42F sends an ACK signal to the selected connection station, and, at the same time, writing of information is conducted into the hop information buffer 42E.

The following will describe another configuration of the mobile station where a channel group used in relaying is selected for every relaying by a channel group assigning method described later, on the basis of FIG. 4B. Since the schematic configuration of the mobile station 40 shown in FIG. 4A is much the same as the aforementioned configuration, the description thereof is omitted herein. However, the configuration of the control signal processor 42 is different from the aforementioned configuration and will be described below.

Figure 4B:
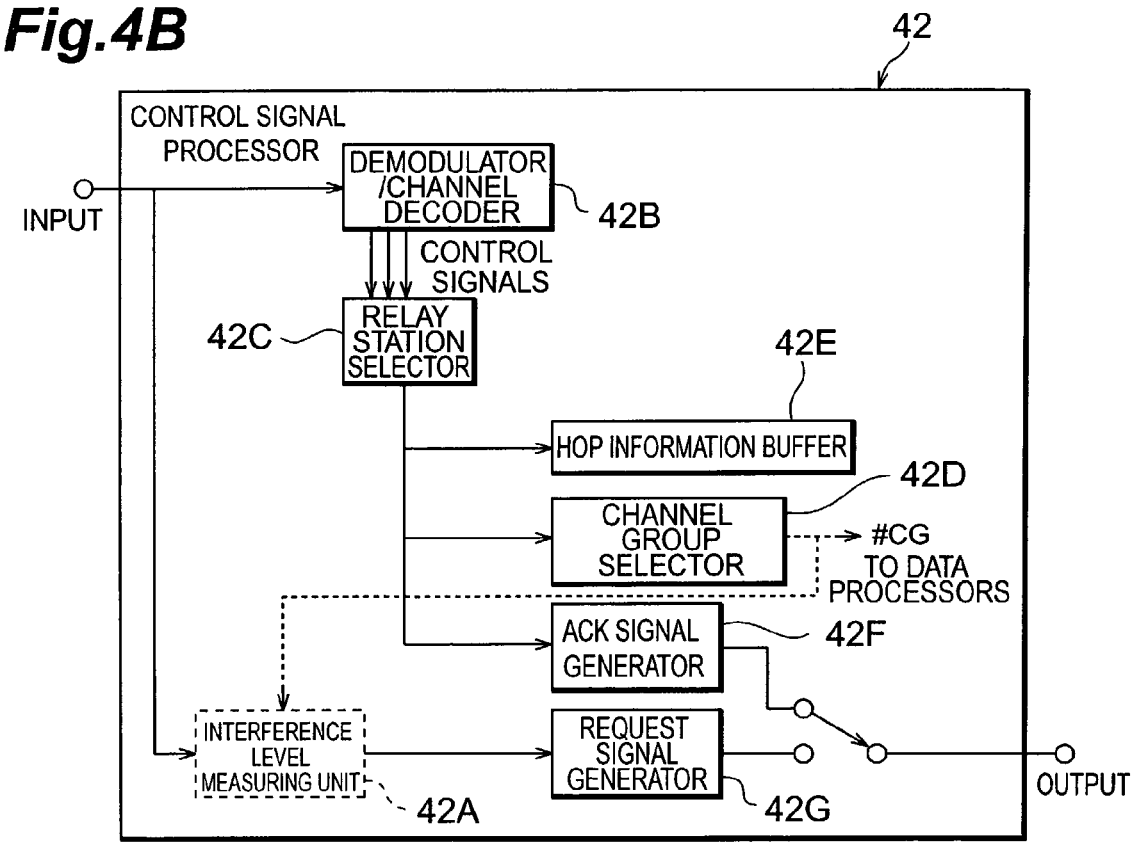
FIG. 4B is a diagram showing a configuration of a control signal processor in a mobile station where channel groups are selected for respective relays by a channel group assigning method.

The control signal processor 42 among these elements is comprised, as shown in FIG. 4B, of a demodulator/channel decoder 42B for demodulating/decoding an input signal; a relay station selector 42C for selecting a relay station; a channel group selector 42D for selecting a channel group; a hop information buffer 42E for storing hop information and other information; an ACK signal generator 42F for generating an ACK signal; and a request signal generator 42G for generating a request signal.

In addition to the above configuration, the control signal processor 42 is preferably configured to further include an interference level measuring unit 42A for measuring an interference level at its own station of a channel group used in reception at the time of receiving a packet, as indicated by a dashed line in FIG. 4B, which enables the relay station to determine whether a packet is transmissible, on the basis of the interference level at the mobile station in downlink packet transmission from the base station via the relay station to the mobile station, in much the same manner as in the uplink packet transmission. It is assumed in the present embodiment that there also exists the interference level measuring unit 42A indicated by the dashed line and that the packet transmission control according to the present invention is executed in both the uplink and downlink packet transmissions. A path deciding method and others about this control will be described later. Channels used in packet transmission may be predetermined channels, or channels maybe determined for every relay. Channels may be divided into groups.

In the control signal processor 42 in the mobile station 40 as described above, control signals discriminated for respective senders by the demodulator/channel decoder 42B are fed to the relay station selector 42C. Then the relay station selector 42C selects one relay station or one base station (i.e., a connection station) meeting connection conditions, the ACK signal generator 42F sends an ACK signal to the selected connection station, and, conducted at the same time is writing of information into the hop information buffer 42E and selection of a channel group used for transmission/reception by the channel group selector 42D.

[On Base Station]

Figure 5A:
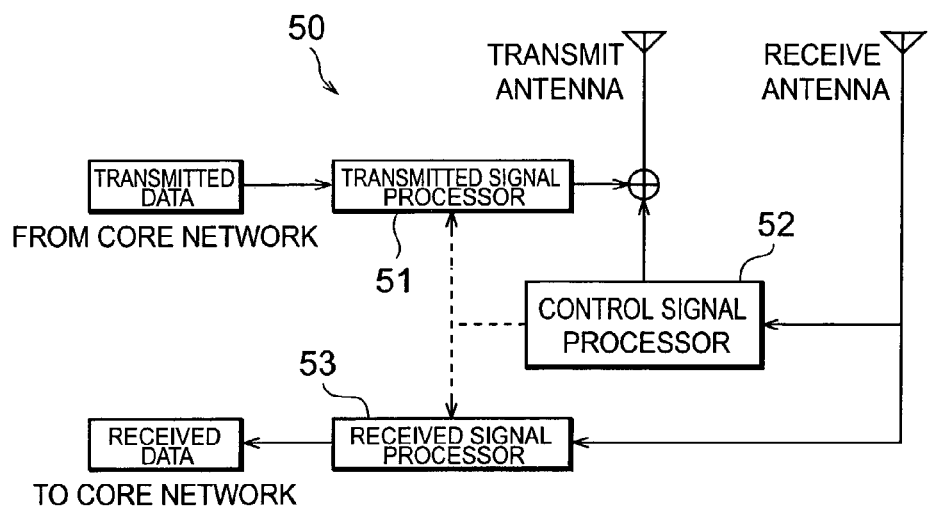
FIG. 5A is a diagram showing an overall configuration of a base station.

A configuration of the base station will be described below referring to FIGS. 5A and 5B. As shown in FIG. 5A, the base station 50 is comprised of a transmitted signal processor 51 for processing transmitted data from the core network and sending resultant data after the processing; a received signal processor 53 for processing a received signal to generate received data to be sent to the core network; and a control signal processor 52 for processing a request signal, a control signal, and an ACK signal.

Figure 5B:
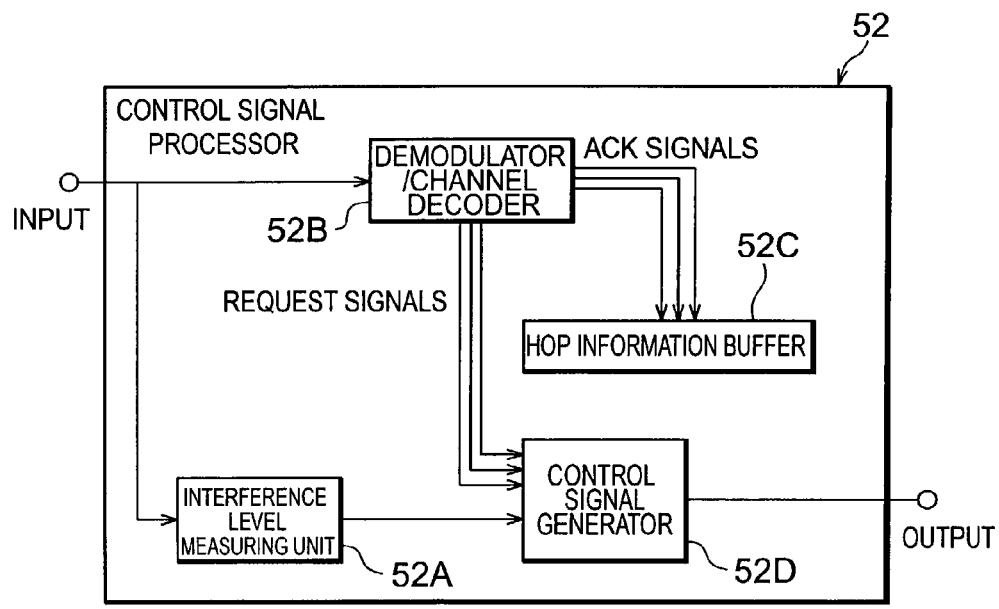
FIG. 5B is a diagram showing a configuration of a control signal processor in a base station.

The control signal processor 52 among these elements is comprised, as shown in FIG. 5B, of an interference level measuring unit 52A for measuring an interference level at its own station; a demodulator/channel decoder 52B for demodulating/decoding an input signal; a hop information buffer 52C for storing information of the hop count and other information; and a control signal generator 52D for generating a control signal.

In the control signal processor 52 in the base station 50 as described above, the demodulator/channel decoder 52B first demodulates and decodes received signals to discriminate request signals and ACK signals for respective senders. The request signals function as triggers to activate the control signal generator 52D. When an ACK signal is received, the hop information of the signal sender is written into the hop information buffer 52C.

[Path Deciding Methods in Each of Mobile Station, Relay Station, and Base Station]

Incidentally, whether communication is possible between stations is judged based on received SIR at the packet receiver station of channels used in communication between the stations. Namely, communication is judged as possible when received SIR at the packet receiver station exceeds a required value; whereas communication is judged as impossible when the received SIR is below the required value. This judgment may be made by the receiver station on the basis of the interference level at its own station, or can be made by the sender station while the receiver station notifies the sender station of the interference level.

There is a case where a plurality of stations exist as stations judged as communicable in this way, and methods of deciding a route to the base station in this case will be detailed below. The route deciding methods include a method of minimizing the hop count (i.e., the hop count from the base station to its own station) (FIG. 7), a method of selecting a station yielding a minimum of relative transmission powers calculated from received SIR of control signals and interference levels at sources of the control signals (FIG. 8), and so on. These methods will be described below using examples based on the mobile station.

In the method of minimizing the hop count (FIG. 7) among the above methods, the mobile station selects a station with a minimum hop count out of relay stations or base stations having sent control signals. It is, however, assumed that the hop count of each base station is 0 and that, as to stations with the same hop count, a station with maximum SIR is selected out of those stations.

Figure 7:
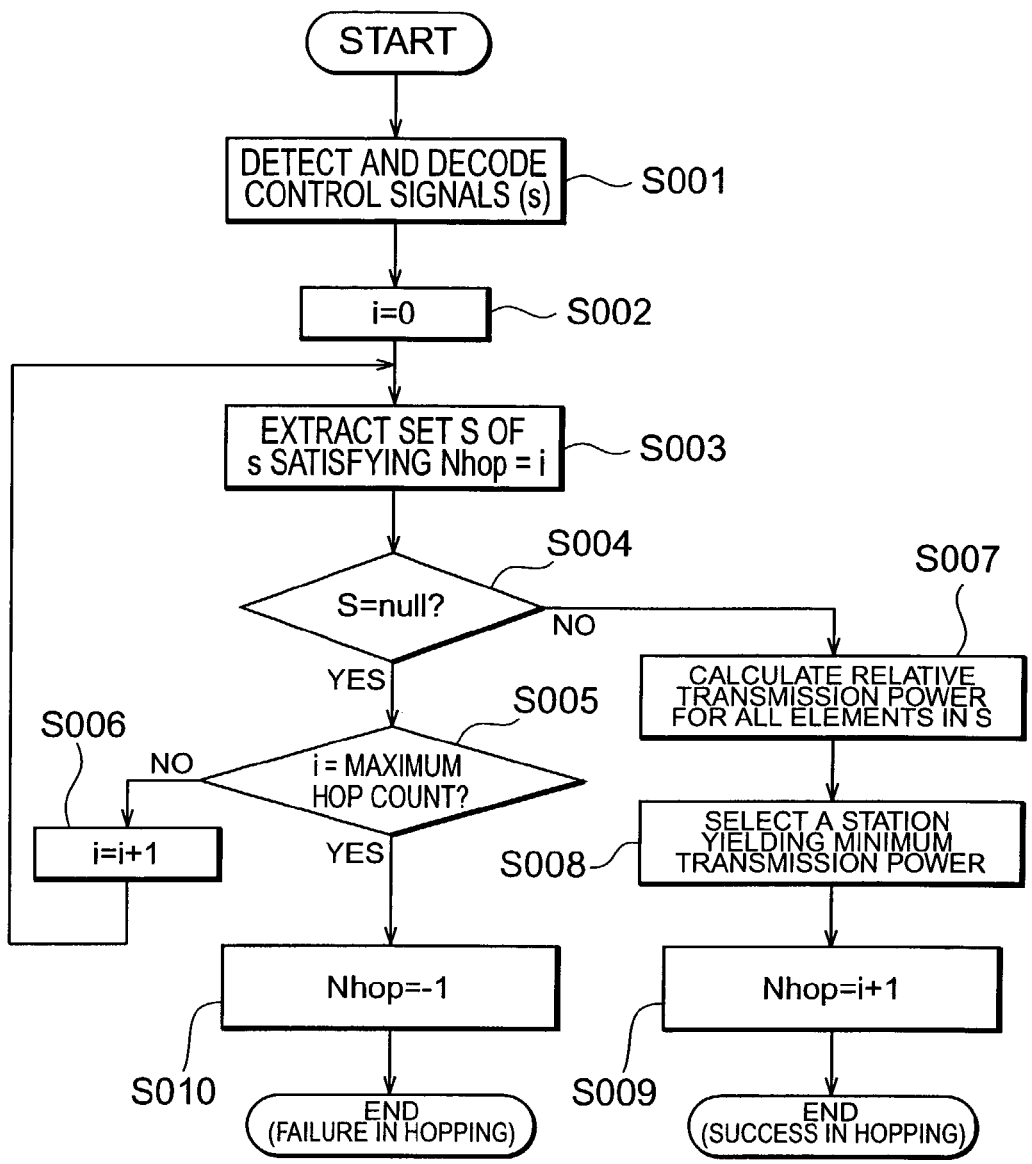
FIG. 7 is a flowchart of processing of selecting a relay station yielding a minimum hop count.

Specifically, processing of FIG. 7 is executed in the mobile station. The first step is to detect and decode control signals s from surrounding relay stations or base stations (S001). After 0 is initially set in counter i (S002), a set S of control signals s to yield the hop count (Nhop)=i is extracted (S003). It is then judged whether the set S is empty (null) (S004), and, if the set S is empty, it is judged whether the counter i reaches a maximum hop count specified in the system (S005). If the counter i does not reach the maximum hop count yet, the counter i is counted up by one (S006), and the processing in and after S003 is again executed for i after the counting-up.

When the set S of control signals s yielding the hop count=i is not empty in S004, the relative transmission power is calculated for all the elements in the set S (S007). A station is selected corresponding to a minimum relative transmission power out of the relative transmission powers thus calculated (S008). Furthermore, a value of addition of 1 to the hop count i of the selected station is put into the hop count Nhop (S009), and the processing is terminated.

This enables the mobile station to select a station with the minimum hop count out of the relay stations or base stations having sent the control signals. In addition, if there exist a plurality of stations with the minimum hop count, the mobile station is able to select a station with maximum SIR out of those stations.

If the counter i reaches the maximum hop count in S005 before detection of a nonempty set S of control signals s yielding the hop count=i in S004, it can be determined that there exists no station capable of serving as a relay station, and the processing ends in a failure in hopping, after a negative number (e.g., "−1") is assigned to the hop count Nhop (S010).

On the other hand, in the method of selecting a station with a minimum relative transmission power amount (FIG. 8), the received control signals are used to calculate the transmission powers of the respective signals: the signals are sorted in ascending order of the transmission powers; whether the hop count is within a predetermined value is checked in the sorted order; and, if it is within the predetermined value, the corresponding station is selected as a connection station.

A method of calculating the transmission power amount Ptx herein is expressed, for example, by Eq (1) below, using the interference level I (dBm) at the packet receiver station and the received signal level S (dB) of the control signal.

$$Ptx = I - S + \text{constant} \tag{1}$$

Figure 8:
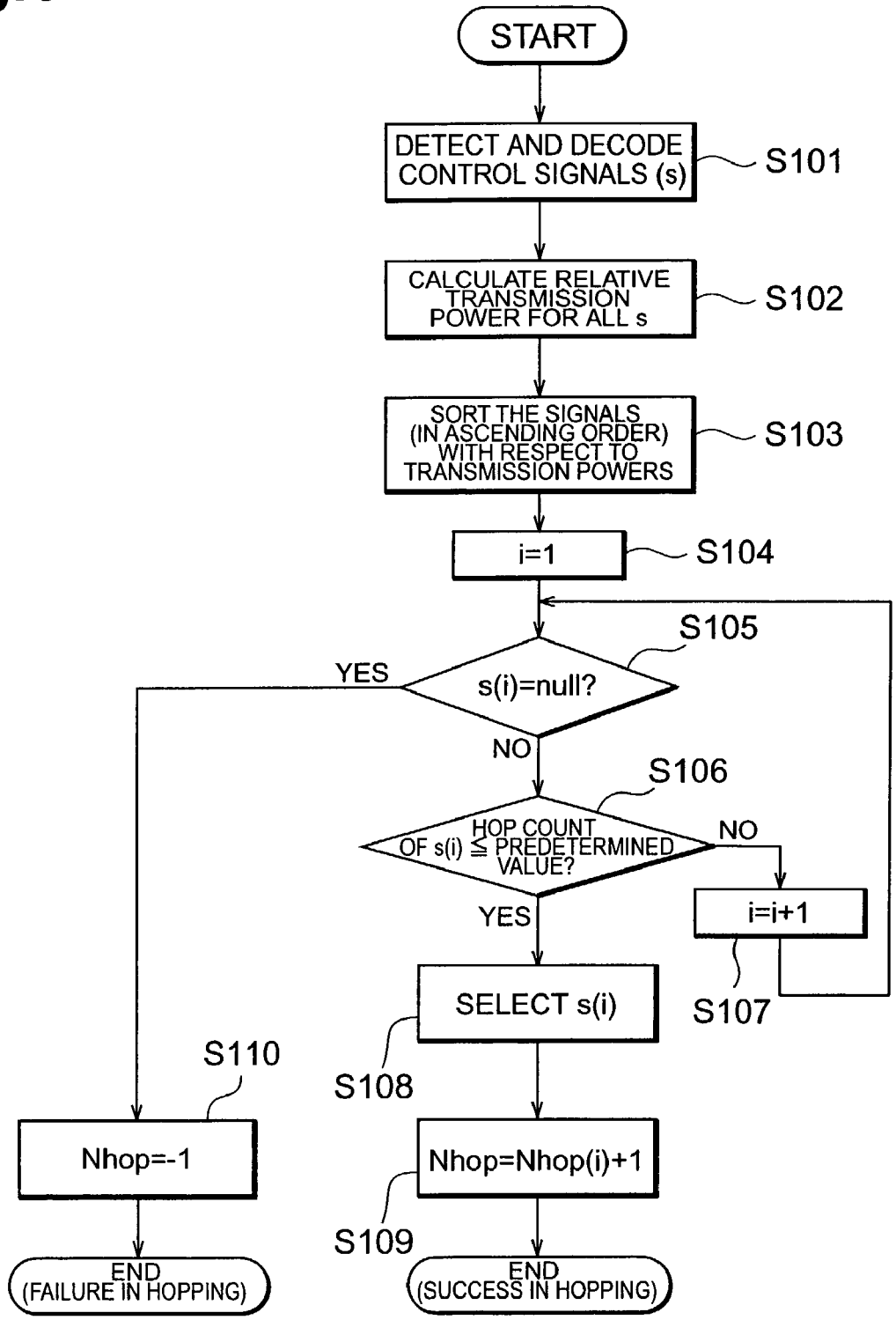
FIG. 8 is a flowchart of processing of selecting a relay station yielding maximum SIR of a control signal.

Specifically, the processing of FIG. 8 is executed in the mobile station. The first step is to detect and decode control signals s from surrounding relay stations or base stations (S101). The next step is to calculate the relative transmission power for all the control signals s (S102), and then the control signals s are sorted in ascending order of the relative transmission powers calculated (S103).

After 1 is initially set in the counter i (S104), it is judged whether the ith control signal s (i) is empty (null) (S105). If the control signal s(i) exists, it is determined whether the hop count of the control signal s (i) is not more than a predetermined value (S106). When the hop count of the control signal s(i) is greater than the predetermined value, the counter i is counted up by one (S107), and the processing in and after S105 is again executed for i after the counting-up.

When the hop count of the control signal s(i) is not more than the predetermined value in S106, it can be determined that the station having sent the control signal s(i) is a station with the minimum relative transmission power amount under the condition that the hop count is not more than the predetermined value, and thus the station having sent the control signal s(i) is selected (S108). Then a value of addition of 1 to the hop count Nhop(i) of the selected station is assigned to the hop count Nhop (S109), and the processing is terminated.

This enables the mobile station to select the station with the minimum relative transmission power amount under the condition that the hop count is not more than the predetermined value. When the control signal s(i) is judged as empty in S105, it can be determined that there exists no station capable of working as a relay station, and the processing ends in a failure in hopping, after a negative number (e.g., "−1") is assigned to the hop count Nhop (S110).

An uplink packet originated in the mobile station and transmitted to the base station or a downlink packet coming from the core network to the base station and transmitted to the mobile station is packet-transmitted through the path determined by the above methods.

A potential method of deciding the transmission power of the packet at this time is a method of sending a training signal for decision of a desired signal level before the packet transmission and notifying a packet source of the desired signal level determined from a reception level of the training signal and an interference level at a receiver station.

[Channel Group Assigning Methods]

The channel group assigning methods, which are one of the features of the present invention, will be detailed below. The channel group assigning methods include, for example, four kinds as follows. Namely, they are four methods: ① a first method using two channel groups; ② a second method using four channel groups; ③ a third method using N channel groups (N is an integer not less than 3); ④ a fourth method using two channels groups. They will be described below in order.

Figure 9:
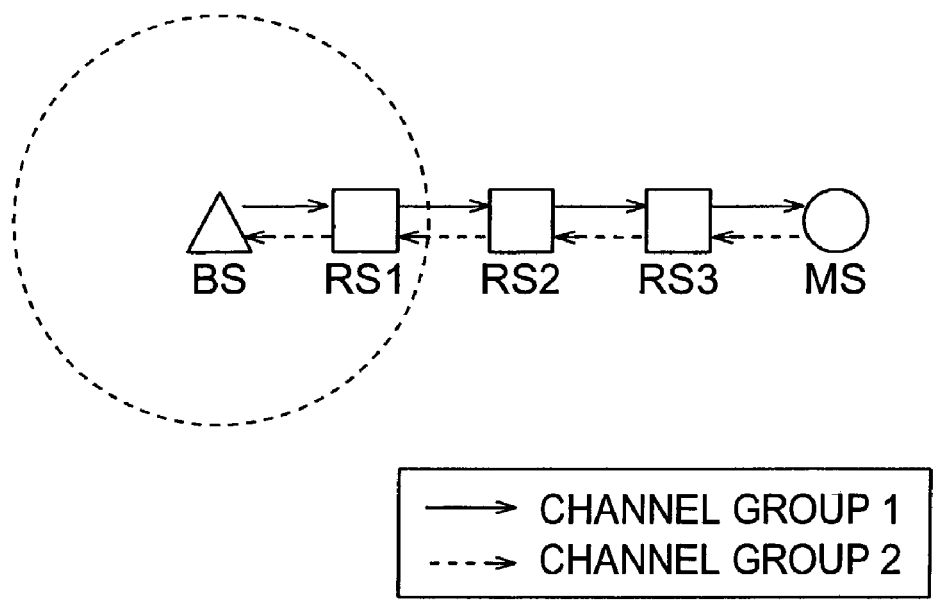
FIG. 9 is a conceptual diagram of a first channel group assigning method.
Figure 10A:
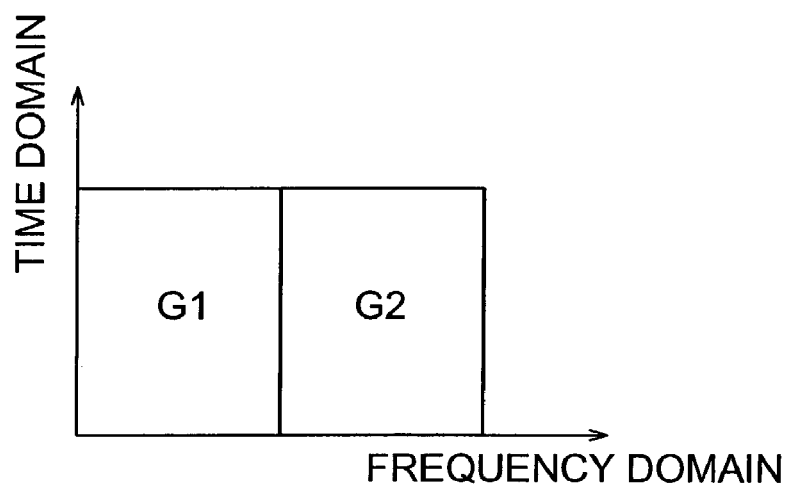
FIG. 10A is a diagram showing an example of setting two channel groups by frequency division.
Figure 10B:
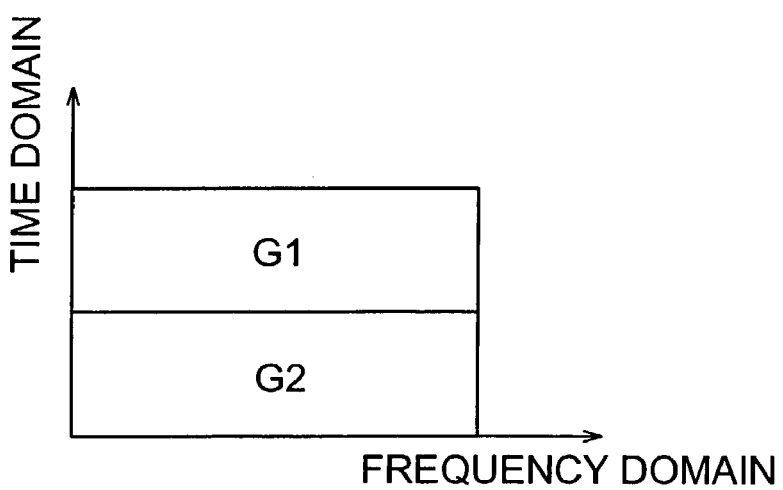
FIG. 10B is a diagram showing an example of setting two channel groups by time division.

In the first method, transmission channels for signal transmission are separated into two channel groups G1, G2. They can be divided by frequency into two frequency bands as shown in FIG. 10A or by time into two time regions as shown in FIG. 10B. FIG. 9 shows the general idea of assignment of channel groups according to the first method, in which the channel group G1 is assigned to downlink signals and the channel group G2 to uplink signals in a common fashion in the base station (BS), relay stations (RS1, RS2, RS3), and mobile station (MS).

Figure 6A:
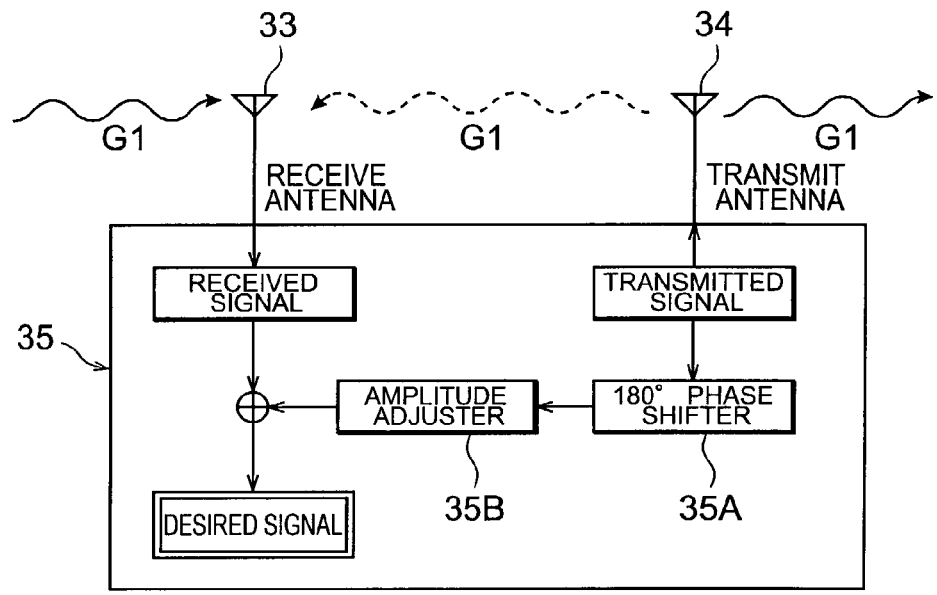
FIG. 6A is a diagram showing a configuration of an interference canceller.
Figure 6B:
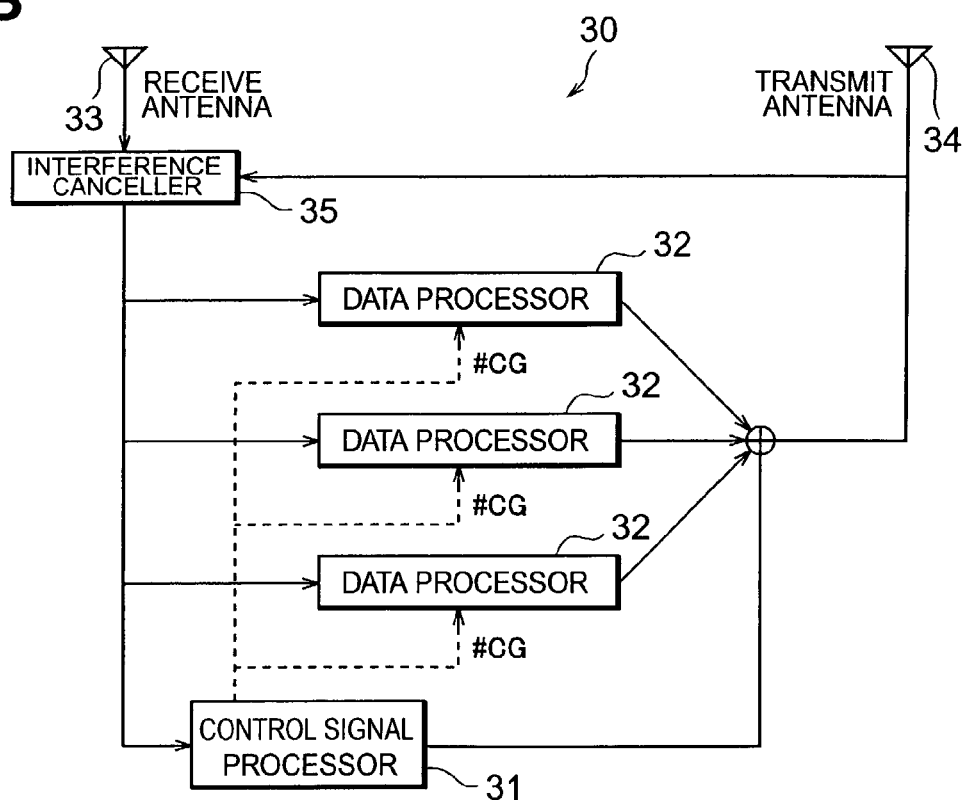
FIG. 6B is a diagram showing a configuration of a relay station provided with the interference canceller.

For each relay station to relay continuous packets in this case, the same channels are used for transmission and reception, and there is thus a possibility that there arises the so-called near-far problem that a signal sent from the relay station interferes with a received signal at the relay station. For overcoming it, an interference canceller 35 shown in FIG. 6A is incorporated in the relay station 30 so as to accept input of both the received signal and transmitted signal, as shown in FIG. 6B. The interference canceller 35 incorporates a 180° phase shifter 35A for shifting the phase of an input signal by 180°; and an amplitude adjuster 35B for adjusting a transmitted signal by an attenuation during propagation thereof up to a receive antenna 33, whereby the transmitted signal from a transmit antenna 34 is converted into a signal to cancel an interference signal (a transmitted signal received at the receive antenna 33), by the 180° phase shifter 35A and amplitude adjuster 35B. When this signal to cancel the interference signal is added to the received signal (a signal including the interference signal), the interference signal component included in the received signal is canceled out, so as to obtain a signal from which interference is eliminated.

In the above first method, the assigned amounts of the frequency bands in FIG. 10A or the assigned amounts of time ranges in FIG. 10B can be made different from each other according to needs between the channel groups G1, G2. Therefore, for example, in the case where the information amount of downlink signals is much greater than the information amount of uplink signals, the assigned amount of the channel group G1 for downlink signals is set much larger than the assigned amount of the channel group G2 for uplink signals, whereby it is feasible to increase the efficiency of utilization of frequency or the efficiency of utilization of time. Since the number of division is minimum, i.e., 2, it is also feasible to limit the so-called division loss.

Figure 11:
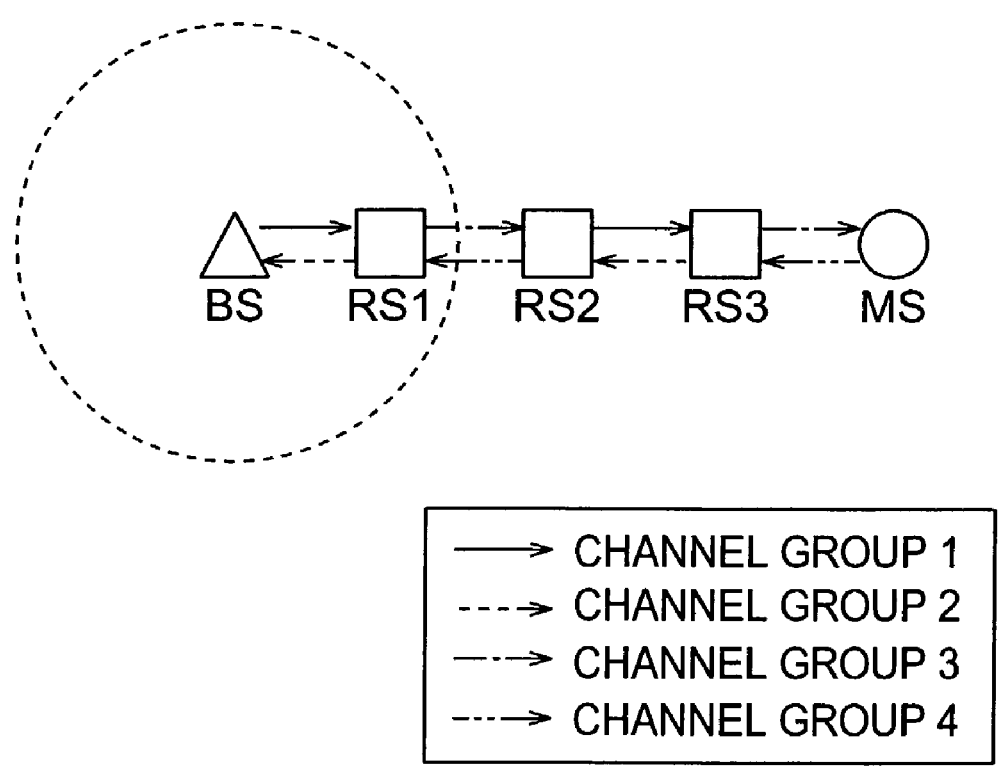
FIG. 11 is a conceptual diagram of a second channel group assigning method.
Figure 12A:
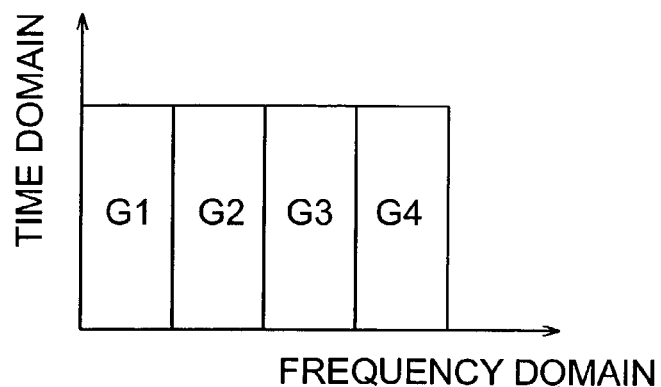
FIG. 12A is a diagram showing an example of setting four channel groups by frequency division.
Figure 12B:
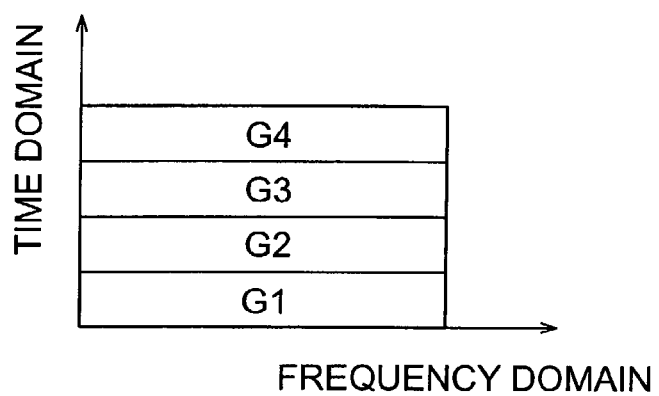
FIG. 12B is a diagram showing an example of setting four channel groups by time division.
Figure 12C:
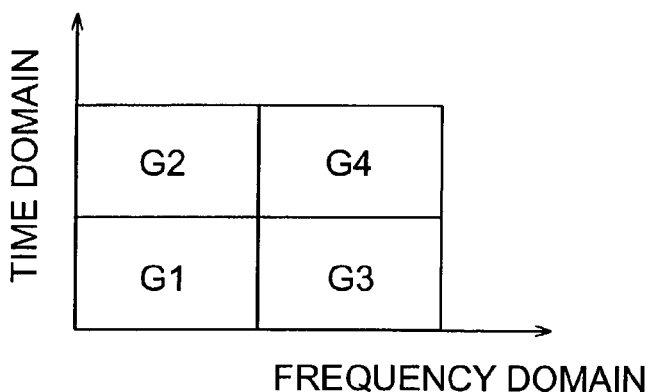
FIG. 12C is a diagram showing an example of setting four channel groups by both frequency division and time division.

In the second method, transmission channels are separated into four channel groups G1, G2, G3, and G4. They may be divided by frequency into four frequency bands as shown in FIG. 12A, or by time into four time zones as shown in FIG. 12B, or by combination of frequency and time into four zones as shown in FIG. 12C. FIG. 11 shows the general idea of assignment of channel groups according to the second method, in which the channel group GI is assigned to downlink signals and the channel group G2 to uplink signals in a common fashion in the base station (BS), each even-numbered relay station (RS2) from the base station, and the mobile station (MS) the hop count of which from the base station is an even number. Furthermore, the channel group G3 is assigned to downlink signals and the channel group G4 to uplink signals in a common fashion in each odd-numbered relay station (RS1, RS3) from the base station.

In this second method, different from the above first method, each relay station uses channels for transmission different from those for reception, and the second method thus has the advantage that the possibility of causing the so-called near-far problem that signals sent from its own station interfere with received signals at its own station is low. Therefore, the relay stations do not have to be equipped with the aforementioned interference canceller 35 of FIG. 6A.

In the second method, the assigned amounts of the respective channel groups as shown in FIGS. 12A to 12C can be made different from each other according to needs. Therefore, for example, in the case where the information amount of downlink signals is much greater than the information amount of uplink signals, the assigned amounts of the channel groups G1, G3 for downlink signals are set much larger than the assigned amounts of the channel groups G2, G4 for uplink signals, whereby it is feasible to enhance the efficiency of utilization of frequency or the efficiency of utilization of time.

In the third method, transmission channels are separated into N channel groups (N is an integer not less than 3); in each of the base station, relay stations, and mobile station, an identical channel group is assigned to uplink and downlink signals transmitted therefrom, and different channel groups are assigned to uplink and downlink signals received therein, respectively. A case of N=3 will be described below.

Figure 14A:
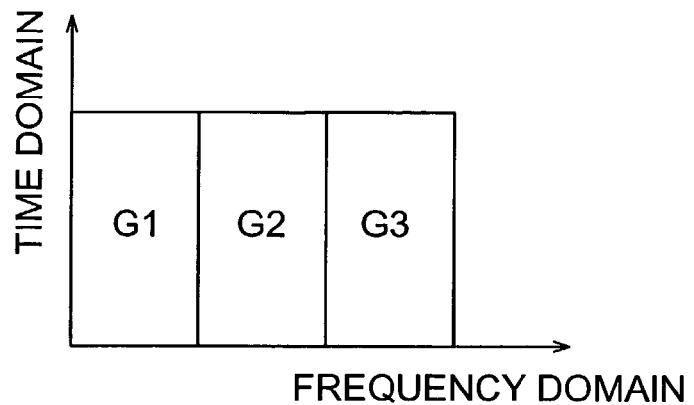
FIG. 14A is a diagram showing an example of setting three channel groups by frequency division.
Figure 14B:
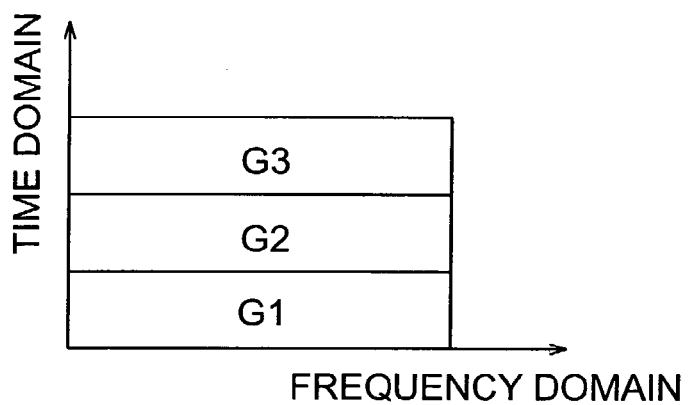
FIG. 14B is a diagram showing an example of setting three channel groups by time division.
Figure 14C:
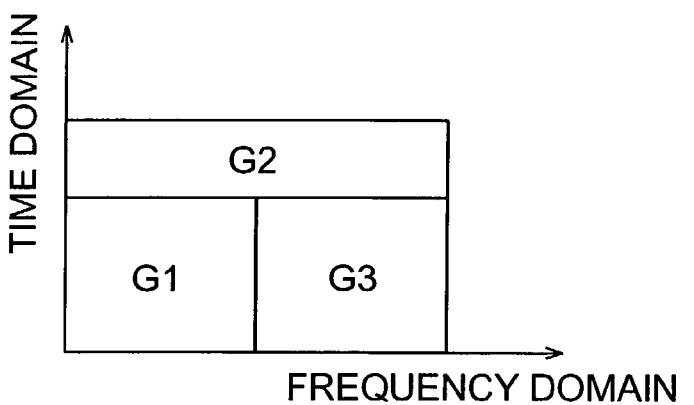
FIG. 14C is a diagram showing a first example of setting three channel groups by both frequency division and time division.
Figure 14D:
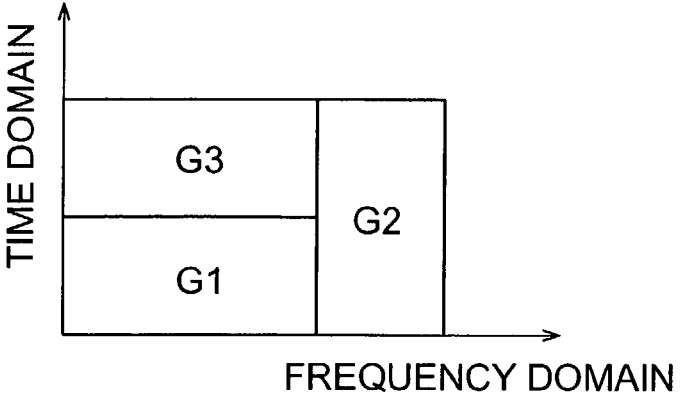
FIG. 14D is a diagram showing a second example of setting three channel groups by both frequency division and time division.

The transmission channels can be separated into three channel groups G1, G2, and G3 by a method of frequency division into three frequency bands as shown in FIG. 14A, by a method of time division into three time zones as shown in FIG. 14B, or by a method of uniformly defining a channel group G2 independent of frequency in a predetermined time zone and defining a channel group G1 lower than a predetermined frequency and a channel group G3 not lower than the predetermined frequency in another time zone than the predetermined time zone as shown in FIG. 14C. It is also possible to employ a method of uniformly defining a channel group G2 independent of time in a predetermined frequency band and defining a channel group G1 in a predetermined time zone and a channel group G3 in another time zone than the predetermined time zone in the frequency band other than the predetermined frequency band as shown in FIG. 14D.

Figure 13:
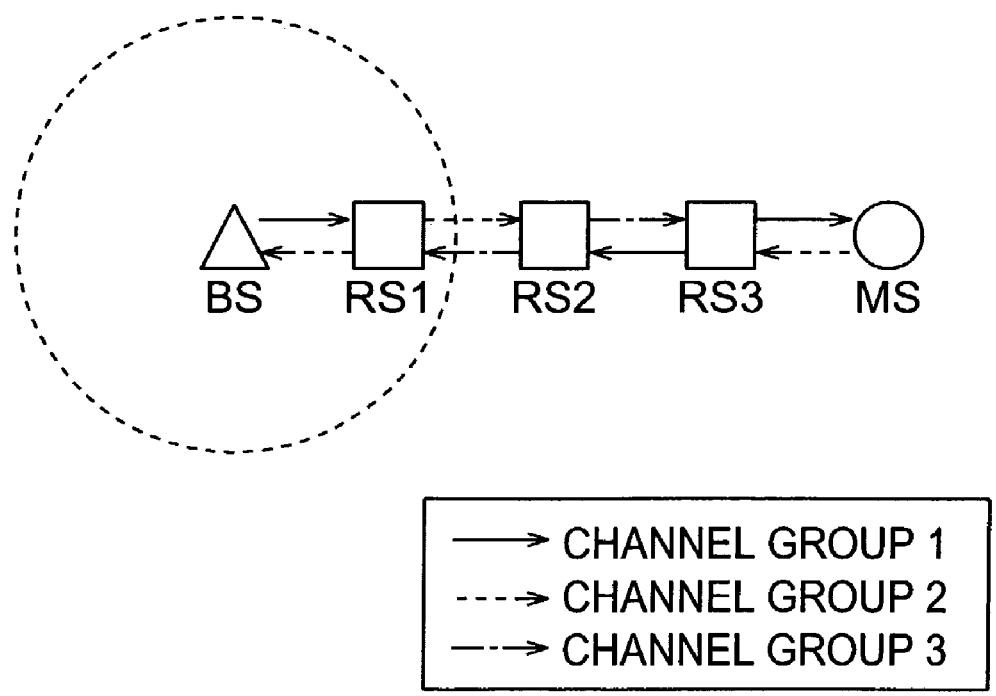
FIG. 13 is a conceptual diagram of a third channel group assigning method.

FIG. 13 shows the general idea of assignment of the channel groups according to the third method, in which the same channel group 1 is assigned to uplink and downlink signals transmitted, in the base station (BS) and in the Nth (third) relay station (RS3) from the base station, in which the same channel group 2 is assigned to uplink and downlink signals transmitted, in the first relay station (RS1) from the base station and in the mobile station (MS) located at the fourth position from the base station, and in which the same channel group 3 is assigned to uplink and downlink signals transmitted, in the second relay station (RS2) from the base station. This results in assigning the different channel groups to uplink and downlink signals received in the base station, the mobile station, and each relay station. For example, concerning the relay station (RS1), the channel group 2 is assigned to the uplink and downlink transmitted signals, the channel group 3 to the uplink received signals, and the channel group 1 to the downlink received signals, which can prevent interference between the signals.

Figure 15:
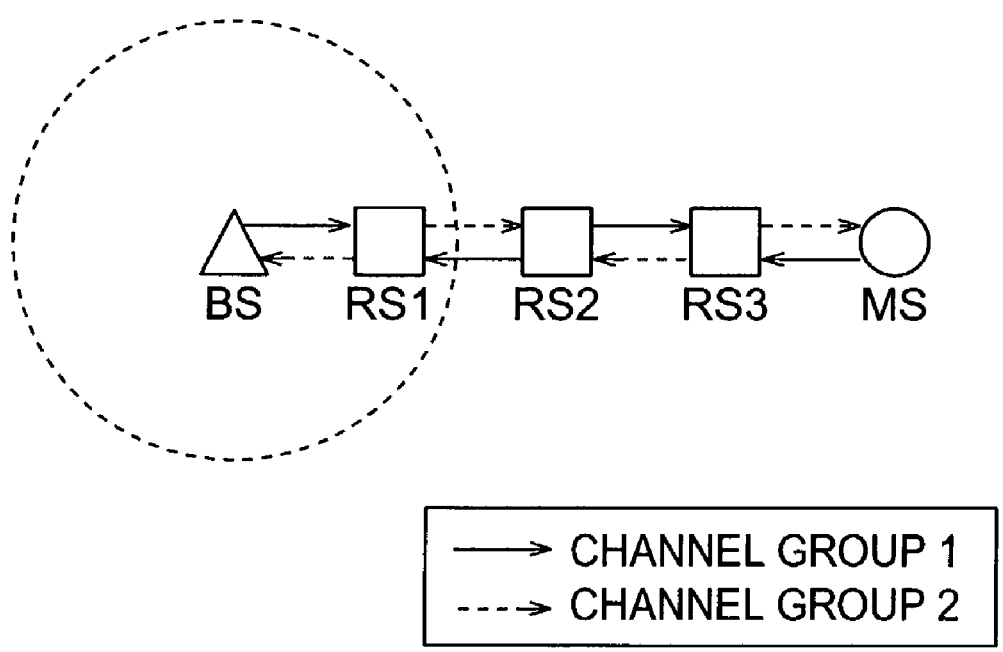
FIG. 15 is a conceptual diagram of a fourth channel group assigning method.

In the fourth method, transmission channels are separated into two channel groups G1, G2. The dividing methods may be the aforementioned frequency division shown in FIG. 10A and time division shown in FIG. 10B. FIG. 15 shows the general idea of assignment of channel groups according to the fourth method, in which the first channel group is used for transmission and the second channel group for reception in the base station and in each even-numbered relay station and mobile station from the base station and in which the second channel group is used for transmission and the first channel group for reception in each odd-numbered relay station and mobile station from the base station. For example, in FIG. 15, the channel group G1 is assigned to transmitted signals and the channel group G2 to received signals in each of the base station (BS), the second relay station RS2 from the base station, and the fourth mobile station (MS) from the base station. Furthermore, the channel group G2 is assigned to transmitted signals and the channel group G1 to received signals in each of the first relay station RS1 from the base station and the third relay station RS3 from the base station.

Since this enables transmission and reception to be conducted by different channel groups in a certain relay station, it is feasible to prevent mutual interference between transmitted and received signals, and it is also feasible to limit the division loss, because the number of division is minimum.

The peculiar channel group assigning methods as described above can reduce interference and enhance the frequency utilization efficiency.

The receiver station may be configured to notify the sender station of a transmission level thereof estimated from the interference level, instead of notifying the sender station of the desired signal level in order to ensure the reception level of the signal to be received by the receiver station, as in the above embodiment.

Incidentally, the technology expected in the next-generation mobile communications includes ad-hoc wireless networks. They are liberated from the communication format through the existing fixed base stations, and are directed to construction of flexible wireless information networks based on the multihop function with terminals themselves having the relaying function.

For adapting to such ad-hoc wireless networks, each base station may be configured to have the function of the relay station, so that the base station can act to relay communication to another base station.

Figure 16:
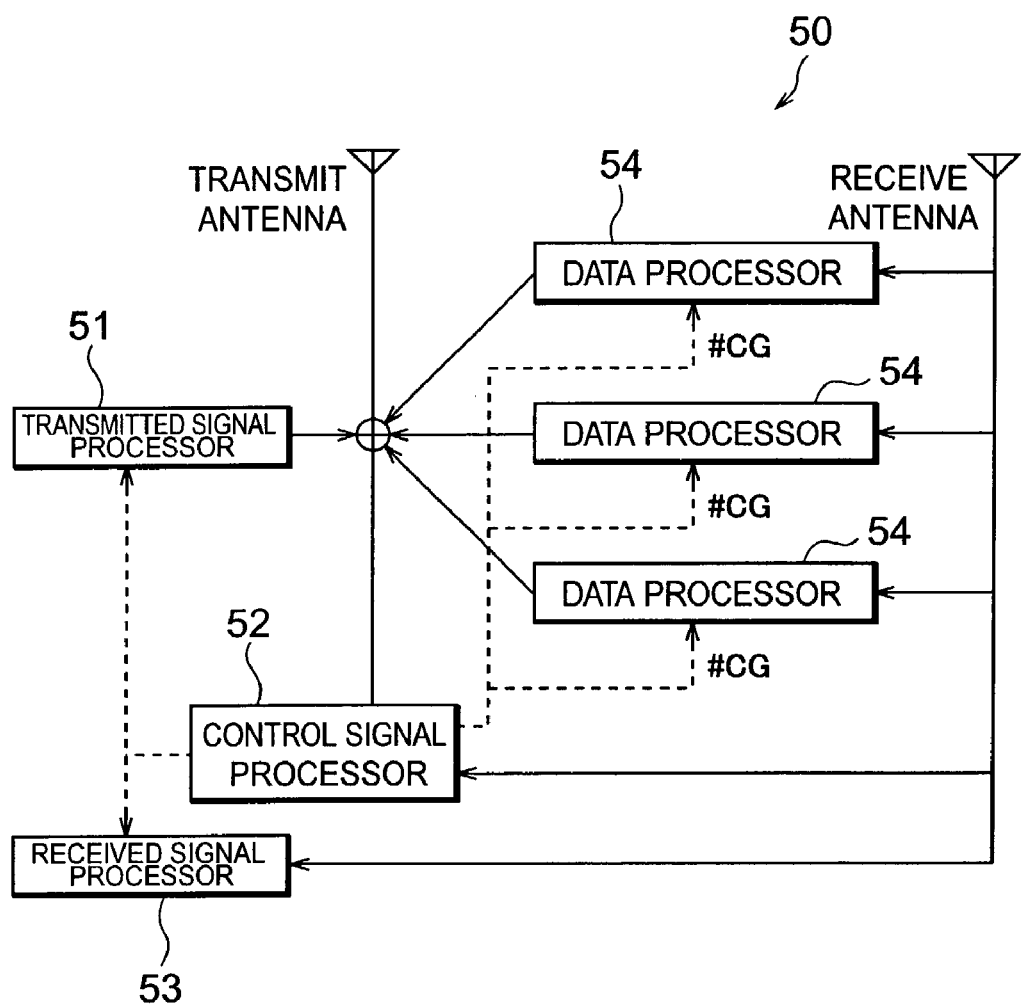
FIG. 16 is a diagram showing a configuration of a base station having the function of the relay station.

For example, as shown in FIG. 16, data processors 54, the number of which is equal to the number of packets relayable in parallel (which corresponds to the number of multiple codes in CDMA and which is "3" in the example of FIG. 16), are added to the configuration of the base station shown in FIG. 5A, and the control signal processor 52 is configured as a processor for processing a signal for securing a route to another base station. Here the additional data processors 54 can be configured in much the same manner as the aforementioned data processors 32 of the relay station (FIG. 3A), and the control signal processor 52 can be configured in much the same manner as the control signal processor 31 of the relay station (FIG. 3A and FIG. 3B).

By also providing the base station with the function of the relay station as described above, it becomes feasible to flexibly adapt to the ad-hoc wireless networks.

It is needless to mention that the radio communication system according to the present invention is applicable to local area networks including a control station and slave stations like wireless LAN, packet transmission networks typified by hierarchical mobile IPv6, and pervasive networks for communication through pocket radios such as radio tags and the like and through white goods connectible to networks. In such cases, elements called radio control stations, access points, and white goods correspond to the base stations in the present embodiment, and elements called radio stations, mobile nodes, and pocket radios (e.g., radio tags and the like) to the mobile stations in the present embodiment.

It is also needless to mention that any of the radio control stations, radio stations, access points, mobile nodes, pocket radios, radio tags, and white goods can be the mobile station, the relay station, or the base station in the present embodiment according to their communication format.

It is also a matter of course that a region called a cell in the present embodiment can be an area in which each sender station can radiate radio waves in the above-stated networks. It is obvious in that case that the communication system does not have to be limited to CDMA but may be any other radio transmission system, including short-range communication such as infrared communication, non-contact magnetic reading, etc. like IrDA and Bluetooth, and contact communication for reading and transmitting myoelectricity of human muscle (weak electricity appearing from muscle).

As described above, the present invention successfully has solved the problem of failure in establishment of communication at the mobile station due to the arrangement of base stations and also solved the hidden terminal problem and others in the conventional CSMA and TDMA base multihop systems and the problems of the increase of traffic and the decrease of throughput of the system. The invention also successfully achieved the reduction of interference and the increase of frequency utilization efficiency by the peculiar channel group assigning methods.

What is claimed is:

1. A radio communication system comprising a base station, a mobile station, and a relay station having a relaying function in multihop packet transmission, and configured to perform communication based on a wireless packet transmission system,
    wherein a receiver station in the multihop packet transmission comprises:
    interference level measuring means for measuring an interference level at the time of receiving a first packet;
    desired signal level calculating means for calculating a desired signal level on the basis of the interference level obtained in the measurement; and
    desired signal level notifying means for notifying a sender station of the desired signal level thus calculated; and
    wherein the sender station comprises:
    transmission power amount calculating means for calculating a transmission power amount of a second packet on the basis of the desired signal level notified of by the receiver station; and
    determining means for determining whether the second packet is transmissible to the receiver station, on the basis of the transmission power amount calculated by the transmission power amount calculating means.

2. The radio communication system according to claim 1, wherein the receiver station further comprises:
    destination deciding means for deciding a next receiver station as a destination of the first packet on the basis of at least one of a reception level of a control signal, the interference level at its own station, and a hop count from a transmission-originating station to its own station.

3. The radio communication system according to claim 1, wherein the interference level measured by the interference level measuring means is an interference level at the receiver station of a channel group used in reception of the first packet.

4. A radio communication system comprising a base station, a mobile station, and a relay station having a relaying function in multihop packet transmission, and configured to perform communication based on a wireless packet transmission system,
    wherein a receiver station in the multihop packet transmission comprises:
    interference level measuring means for measuring an interference level at the time of receiving a first packet;
    desired signal level calculating means for calculating a desired signal level on the basis of the interference level obtained in the measurement;
    determining means for determining whether a second packet is transmissible from a sender station, on the basis of at least one of the interference level, the desired signal level, a reception level of a control signal, and a hop count from a transmission-originating station to its own station; and
    notifying means for notifying the sender station of the desired signal level according to a result of the determination by the determining means.

5. The radio communication system according to claim 4, wherein the receiver station further comprises:

destination deciding means for deciding a next receiver station as a destination of a third packet on the basis of at least one of the reception level of the control signal, the interference level at its own station, and the hop count from the transmission-originating station to its own station.

6. The radio communication system according to claim 4, wherein the interference level measured by the interference level measuring means is an interference level at the receiver station of a channel group used in reception of the first packet.

7. A radio communication system comprising a base station, a mobile station, and a relay station having a relaying function in packet transmission, and applying CDMA to a radio multiplexing scheme of packet transmission,
wherein the base station or the relay station comprises:
interference level measuring means for measuring an interference level at its own station of a channel group used in reception, at the time of receiving a first packet;
desired signal level calculating means for calculating a desired signal level on the basis of the interference level obtained in the measurement; and
desired signal level notifying means for notifying the mobile station of the desired signal level thus calculated; and
wherein the mobile station comprises:
transmission power amount calculating means for calculating a transmission power amount of a second packet on the basis of the desired signal level notified of by the base station or the relay station; and
determining means for determining whether the second packet is transmissible to a station that is a source of the desired signal level, on the basis of the transmission power amount calculated by the transmission power amount calculating means.

8. The radio communication system according to claim 7, wherein the base station further comprises:
attribution information holding means which holds attribution information of each mobile station and each relay station capable of direct communication with its own station, and attribution information of each mobile station and each relay station incapable of direct communication with its own station but capable of direct communication with each relay station.

9. The radio communication system according to claim 7, wherein the base station further comprises:
channel group selecting means for selecting a channel group for transmission/reception on the basis of a transmitting direction of a packet; and
signal transmitting means for transmitting a signal to be transmitted, on a channel according to the selected channel group.

10. The radio communication system according to claim 7, wherein the mobile station further comprises:
destination deciding means for deciding a base station or a relay station that is a destination to which the mobile station should transmit a packet, on the basis of a reception level of a control signal or a hop count from the base station to its own station.

11. The radio communication system according to claim 7, wherein the mobile station further comprises:
channel group selecting means for selecting a channel group for transmission/reception on the basis of both or one of a hop count from the base station to its own station and a transmitting direction of a packet; and
signal transmitting means for transmitting a signal to be transmitted, on a channel according to the selected channel group.

12. The radio communication system according to claim 7, wherein the relay station further comprises:
destination deciding means for deciding a station that is a destination to which the relay station should transmit a packet, on the basis of a reception level of a control signal or a hop count from the base station to its own station.

13. The radio communication system according to claim 7, wherein the relay station further comprises:
decoding means for despreading a signal received from the mobile station, the base station, and another relay station to decode the signal into an information sequence signal; and
spread signal generating means for spreading the decoded information sequence signal to generate a spread signal.

14. The radio communication system according to claim 13, wherein, when the relay station comprises at least the transmission power amount calculating means,
the transmission power calculated by the transmission power amount calculating means is assigned to the spread signal generated by the spread signal generating means, and the spread signal is transmitted.

15. The radio communication system according to claim 7, wherein the relay station further comprises:
channel group selecting means for selecting a channel group for transmission/reception on the basis of both or one of a hop count from the base station to its own station and a transmitting direction of the first packet; and
signal transmitting means for transmitting a signal to be transmitted, on a channel according to the selected channel group.

16. The radio communication system according to claim 7, wherein the relay station is comprised of a station having a function of the mobile station, or a relaying device installed in a vehicle or in stationary facilities.

17. A radio communication system comprising a base station, a mobile station, and a relay station having a relaying function in packet transmission, and applying CDMA to a radio multiplexing scheme of packet transmission,
wherein each of the base station, the relay station, and the mobile station comprises:
interference level measuring means for measuring an interference level at its own station of a channel group used in reception, at the time of receiving a first packet;
desired signal level calculating means for calculating a desired signal level on the basis of the interference level obtained in the measurement;
desired signal level notifying means for notifying a sender station of the first packet, of the desired signal level thus calculated;
transmission power amount calculating means for calculating a transmission power amount of a second packet on the basis of a desired signal level notified of by another station, at the time of transmitting or relaying a packet; and
determining means for determining whether the second packet is transmissible to a station that is a source of the desired signal level, on the basis of the transmission power amount calculated by the transmission power amount calculating means.

18. The radio communication system according to claim 17, wherein the base station further comprises:
attribution information holding means which holds attribution information of each mobile station and each relay station capable of direct communication with its own station, and attribution information of each mobile station and each relay station incapable of direct communication with its own station but capable of direct communication with each relay station.

19. The radio communication system according to claim 17, wherein the base station further comprises:
destination deciding means for deciding a mobile station or a relay station that is a destination to which the base station should transmit a third packet, on the basis of at least one of a reception level of a control signal, a second interference level at its own station, and a hop count from a transmission-originating station to its own station.

20. The radio communication system according to claim 17, wherein the base station further comprises:
channel group selecting means for selecting a channel group for transmission/reception on the basis of a transmitting direction of a third packet; and
signal transmitting means for transmitting a signal to be transmitted, on a channel according to the selected channel group.

21. The radio communication system according to claim 17, wherein the mobile station further comprises:
destination deciding means for deciding a base station or a relay station that is a destination to which the mobile station should transmit a third packet, on the basis of a reception level of a control signal or a hop count from the base station to its own station.

22. The radio communication system according to claim 17, wherein the mobile station further comprises:
channel group selecting means for selecting a channel group for transmission/reception on the basis of both or one of a hop count from the base station to its own station and a transmitting direction of a packet; and
signal transmitting means for transmitting a signal to be transmitted, on a channel according to the selected channel group.

23. The radio communication system according to claim 17, wherein the relay station further comprises:
destination deciding means for deciding a station that is a destination to which the relay station should transmit a packet, on the basis of a reception level of a control signal or a hop count from the base station to its own station.

24. The radio communication system according to claim 17, wherein the relay station further comprises:
decoding means for despreading a signal received from the mobile station, the base station, and another relay station to decode the signal into an information sequence signal; and
spread signal generating means for spreading the decoded information sequence signal to generate a spread signal.

25. The radio communication system according to claim 24, wherein, when the relay station comprises at least the transmission power amount calculating means,
the transmission power calculated by the transmission power amount calculating means is assigned to the spread signal generated by the spread signal generating means, and the spread signal is transmitted.

26. The radio communication system according to claim 17, wherein the relay station further comprises:
channel group selecting means for selecting a channel group for transmission/reception on the basis of both or one of a hop count from the base station to its own station and a transmitting direction of a packet; and
signal transmitting means for transmitting a signal to be transmitted, on a channel according to the selected channel group.

27. The radio communication system according to claim 17, wherein the relay station is comprised of a station having a function of the mobile station, or a relaying device installed in a vehicle or in stationary facilities.

28. A base station constituting a radio communication system for communication based on a wireless packet transmission system, with a mobile station and a relay station having a relaying function in packet transmission, the base stations comprising:
interference level measuring means for measuring an interference level at the time of receiving a packet;
desired signal level calculating means for calculating a desired signal level on the basis of the interference level obtained in the measurement; and
desired signal level notifying means for notifying a sender station of the packet, of the desired signal level thus calculated.

29. The base station according to claim 28, wherein the interference level measured by the interference level measuring means is an interference level at the base station of a channel group used in reception of the packet.

30. The base station according to claim 28, further comprising:
transmission power amount calculating means for calculating a transmission power amount of a second packet on the basis of a desired signal level notified of by another station, at the time of transmitting a packet; and
determining means for determining whether the second packet is transmissible to a station that is a source of the desired signal level, on the basis of the transmission power amount calculated by the transmission power amount calculating means.

31. The base station according to claim 30, further comprising destination deciding means for deciding a mobile station or a relay station that is a destination to which the base station should transmit a third packet, on the basis of at least one of a reception level of a control signal, a second interference level at its own station, and a hop count from a transmission-originating station to its own station.

32. The base station according to claim 28, further comprising attribution information holding means which holds attribution information of each mobile station and each relay station capable of direct communication with its own station, and attribution information of each mobile station and each relay station incapable of direct communication with its own station but capable of direct communication with each relay station.

33. The base station according to claim 28, further comprising:
channel group selecting means for selecting a channel group for transmission/reception on the basis of a transmitting direction of a packet; and
signal transmitting means for transmitting a signal to be transmitted, on a channel according to the selected channel group.

34. A base station constituting a radio communication system applying CDMA to a radio multiplexing scheme of packet transmission, with a mobile station and a relay station having a relaying function in packet transmission, the base stations comprising:
interference level measuring means for measuring an interference level at its own station of a channel group used in reception, at the time of receiving a packet;
desired signal level calculating means for calculating a desired signal level on the basis of the interference level obtained in the measurement; and desired signal level notifying means for notifying a sender station of the packet, of the desired signal level thus calculated.

35. A mobile station constituting a radio communication system for communication based on a wireless packet transmission system, with a base station and a relay station having a relaying function in packet transmission, the mobile stations comprising:
- transmission power amount calculating means for calculating a transmission power amount of a packet on the basis of a desired signal level notified of by a sender station of the packet;
- determining means for determining whether the packet is transmissible from the sender station, on the basis of the transmission power amount calculated by the transmission power amount calculating means;
- interference level measuring means for measuring an interference level at the time of receiving a second packet;
- desired signal level calculating means for calculating a desired signal level on the basis of the interference level obtained in the measurement; and
- desired signal level notifying means for notifying the sender station of the first packet, of the desired signal level thus calculated.

36. The mobile station according to claim 35, wherein the interference level measured by the interference level measuring means is an interference level at the mobile station of a channel group used in reception of the second packet.

37. The mobile station according to claim 35, further comprising destination deciding means for deciding a base station or a relay station that is a destination to which the mobile station should transmit a packet, on the basis of at least one of a reception level of a control signal, an interference level at its own station, and a hop count from a transmission-originating station to its own station.

38. The mobile station according to claim 35, further comprising:
- channel group selecting means for selecting a channel group for transmission/reception on the basis of both or one of a hop count from the base station to its own station and a transmitting direction of a packet; and
- signal transmitting means for transmitting a signal to be transmitted, on a channel according to the selected channel group.

39. A mobile station constituting a radio communication system applying CDMA to a radio multiplexing scheme of packet transmission, with a base station and a relay station having a relaying function in packet transmission, the mobile stations comprising:
- transmission power amount calculating means for calculating a transmission power amount of a packet on the basis of a desired signal level notified of by the base station or the relay station;
- determining means for determining whether the packet is transmissible to a station that is a source of the desired signal level, on the basis of the transmission power amount calculated by the transmission power amount calculating means;
- interference level measuring means for measuring an interference level at the time of receiving a second packet;
- desired signal level calculating means for calculating a desired signal level on the basis of the interference level obtained in the measurement; and
- desired signal level notifying means for notifying a sender station of the first packet, of the desired signal level thus calculated.

40. A relay station constituting a radio communication system for communication based on a wireless packet transmission system, with a base station and a mobile station and having a relaying function in packet transmission, the relay station, comprising:
- interference level measuring means for measuring an interference level at the time of receiving a packet;
- desired signal level calculating means for calculating a desired signal level on the basis of the interference level obtained in the measurement; and
- desired signal level notifying means for notifying a sender station of the packet, of the desired signal level thus calculated.

41. The relay station according to claim 40, further comprising:
- determining means for determining whether a second packet is transmissible from the sender station, on the basis of at least one of the interference level, the desired signal level, a reception level of a control signal, and a hop count from the base station to its own station,
- wherein the desired signal level notifying means notifies the sender station of the desired signal level according to a result of the determination by the determining means.

42. The relay station according to claim 40, wherein the interference level measured by the interference level measuring means is an interference level at the relay station of a channel group used in reception of the packet.

43. The relay station according to claim 40, further comprising:
- transmission power amount calculating means for calculating a transmission power amount of a second packet on the basis of a desired signal level notified of by another station, at the time of relaying a packet; and
- determining means for determining whether the second packet is transmissible to a station that is a source of the desired signal level, on the basis of the transmission power amount calculated by the transmission power amount calculating means.

44. The relay station according to claim 40, further comprising destination deciding means for deciding a station that is a destination to which the relay station should transmit a second packet, on the basis of at least one of a reception level of a control signal, a second interference level at its own station, and a hop count from a transmission-originating station to its own station.

45. The relay station according to claim 40, further comprising:
- decoding means for despreading a signal received from the mobile station, the base station, and another relay station to decode the signal into an information sequence signal; and
- spread signal generating means for spreading the decoded information sequence signal to generate a spread signal.

46. The relay station according to claim 45, wherein, when the relay station comprises at least the transmission power amount calculating means,
- the transmission power calculated by the transmission power amount calculating means is assigned to the spread signal generated by the spread signal generating means and the spread signal is transmitted.

47. The relay station according to claim 40, further comprising:
- channel group selecting means for selecting a channel group for transmission/reception on the basis of a hop count from a transmission-originating station to its own station; and signal transmitting means for transmitting a signal to be transmitted, on a channel according to the selected channel group.

48. The relay station according to claim 40, the relay station being comprised of a station having a function of the mobile station, or a relaying device installed in a vehicle or in stationary facilities.

49. A relay station constituting a radio communication system applying CDMA to a radio multiplexing scheme of packet transmission, with a base station and a mobile station and having a relaying function in packet transmission, the relay station, comprising:
- interference level measuring means for measuring an interference level at its own station of a channel group used in reception, at the time of receiving a packet;
- desired signal level calculating means for calculating a desired signal level on the basis of the interference level obtained in the measurement; and
- desired signal level notifying means for notifying a sender station of the packet, of the desired signal level thus calculated.

50. A packet transmission control method in a radio communication system comprising a base station, a mobile station, and a relay station having a relaying function in multihop packet transmission and configured to perform communication based on a wireless packet transmission system, the packet transmission control method, comprising:
- an interference level measuring step wherein a receiver station in the multihop packet transmission measures an interference level;
- a desired signal level calculating step wherein the receiver station calculates a desired signal level on the basis of the interference level obtained in the measurement;
- a desired signal level notifying step wherein the receiver station notifies a sender station of the desired signal level thus calculated;
- a transmission power amount calculating step wherein the sender station calculates a transmission power amount of a packet on the basis of the desired signal level thus notified of;
- a determining step wherein the sender station determines whether the packet is transmissible to the receiver station, on the basis of the transmission power amount thus calculated; and
- a packet transmitting step wherein the sender station transmits the packet by a power according to the transmission power amount for the receiver station, to the receiver station determined as a packet-transmissible station.

51. The packet transmission control method according to claim 50, further comprising a mobile station destination deciding step wherein the mobile station defined as the receiver station decides a base station or a relay station that is a destination to which the mobile station should transmit a second packet, on the basis of at least one of a reception level of a control signal, a second interference level at its own station, and a hop count from a transmission-originating station to its own station.

52. The packet transmission control method according to claim 50, further comprising a base station destination deciding step wherein the base station defined as the receiver station decides a mobile station or a relay station that is a destination to which the base station should transmit a second packet, on the basis of at least one of a reception level of a control signal, a second interference level at its own station, and a hop count from a transmission-originating station to its own station.

53. The packet transmission control method according to claim 50, further comprising a relay station destination deciding step wherein the relay station defined as the receiver station decides a station that is a destination to which the relay station should transmit a second packet, on the basis of at least one of a reception level of a control signal, a second interference level at its own station, and a hop count from a transmission-originating station to its own station.

54. The packet transmission control method according to claim 50, further comprising:
- a decoding step wherein the relay station despreads a signal received from the mobile station, the base station, and another relay station to decode the signal into an information sequence signal; and
- a spread signal generating step wherein the relay station spreads the decoded information sequence signal to generate a spread signal.

55. The packet transmission control method according to claim 50, further comprising:
- a channel group selecting step wherein the mobile station and the relay station select a channel group for transmission/reception on the basis of both or one of a hop count from a transmission-originating station to its own station and a transmitting direction of a packet and wherein the base station selects a channel group for transmission/reception on the basis of a transmitting direction of a packet; and
- a signal transmitting step wherein the mobile station, the relay station, and the base station transmit a signal to be transmitted, on a channel according to the selected channel group.

56. The packet transmission control method according to claim 55, wherein the channel group selecting step is to divide transmission channels for transmission of signals into two channel groups, and
wherein in a common manner in the base station, the relay station, and the mobile station, one channel group is assigned to an uplink signal a source of which is the mobile station, and the other channel group is assigned to a downlink signal a source of which is the base station.

57. The packet transmission control method according to claim 55, wherein the channel group selecting step is to divide transmission channels for transmission of signals into four channel groups,
wherein in a common manner is the base station, the relay station even-numbered from the base station, and the mobile station a hop count of which from the base station is an even number, a first channel group is assigned to a downlink signal a source of which is the base station, and a second channel group is assigned to an uplink signal a source of which is the mobile station, and
wherein in a common manner in the relay station odd-numbered from the base station, and the mobile station a hop count of which from the base station is an odd number, a third channel group is assigned to the downlink signal and a fourth channel group is assigned to the uplink signal.

58. The packet transmission control method according to claim 55, wherein the channel group selecting step is to divide transmission channels for transmission of signals into N channel groups (N is an integer not less than 3), and
wherein in each of the base station, the relay station, and the mobile station, the N channel groups are assigned so that an identical channel group is assigned to an uplink signal and a downlink signal transmitted from one station and so that different channel groups are assigned to an uplink signal and a downlink signal received thereby, respectively.

59. The packet transmission control method according to claim 55, wherein the channel group selecting step is to divide transmission channels for transmission of signals into two channel groups,
- wherein transmission from the base station and from the relay station and the mobile station even-numbered from the base station is carried out by a first channel group and reception therein by a second channel group, and
- wherein transmission from the relay station and the mobile station odd-numbered from the base station is carried out by the second channel group and reception therein by the first channel group.

60. The packet transmission control method according to claim 55, wherein the channel groups are comprised of channel groups divided by frequency.

61. The packet transmission control method according to claim 55, wherein the channel groups are comprised of channel groups divided by time.

62. The packet transmission control method according to claim 55, wherein the channel groups are comprised of channel groups divided by both frequency and time.

63. A packet transmission control method executed at the time of transmitting a first packet from a mobile station via a relay station to a base station in a radio communication system comprising the base station, the mobile station, and the relay station having a relaying function in packet transmission and applying CDMA to a radio multiplexing scheme of packet transmission, the packet transmission control method, comprising:
- an interference level measuring step wherein a receiver station of a second packet measures an interference level at its own station of the received packet;
- a desired signal level calculating step wherein the receiver station calculates a desired signal level on the basis of the interference level obtained in the measurement;
- a desired signal level notifying step wherein the receiver station notifies a sender station of the second packet, of the desired signal level thus calculated;
- a transmission power amount calculating step wherein the sender station calculates a transmission power amount of a third packet on the basis of the desired signal level thus notified of;
- a determining step wherein the sender station determines whether the third packet is transmissible to the receiver station, on the basis of the transmission power amount thus calculated; and
- a packet transmitting step wherein the sender station transmits the third packet by a power according to the transmission power amount for the receiver station, to the receiver station determined as a packet-transmissible station.

* * * * *

UNITED STATES PATENT AND TRADEMARK OFFICE
CERTIFICATE OF CORRECTION

| | | |
|---|---|---|
| PATENT NO. | : 7,519,029 B2 | Page 1 of 1 |
| APPLICATION NO. | : 10/328025 | |
| DATED | : April 14, 2009 | |
| INVENTOR(S) | : Takeda et al. | |

It is certified that error appears in the above-identified patent and that said Letters Patent is hereby corrected as shown below:

On the title page, the Terminal Disclaimer information was listed in error. Item (45) and the Notice information should read as follows:

--(45) Date of Patent: Apr. 14, 2009--

On the Title Page:

The first or sole Notice should read --

Subject to any disclaimer, the term of this patent is extended or adjusted under 35 U.S.C. 154(b) by 1310 days.

Signed and Sealed this

Twelfth Day of October, 2010

David J. Kappos
*Director of the United States Patent and Trademark Office*